US010967930B2

(12) United States Patent
Minaker

(10) Patent No.: US 10,967,930 B2
(45) Date of Patent: Apr. 6, 2021

(54) MULTI-LINK SUSPENSION SYSTEM

(71) Applicant: Bruce Minaker, Windsor (CA)

(72) Inventor: Bruce Minaker, Windsor (CA)

( * ) Notice: Subject to any disclaimer, the term of this patent is extended or adjusted under 35 U.S.C. 154(b) by 162 days.

(21) Appl. No.: 16/118,835

(22) Filed: Aug. 31, 2018

(65) Prior Publication Data

US 2019/0071147 A1     Mar. 7, 2019

Related U.S. Application Data

(60) Provisional application No. 62/553,775, filed on Sep. 1, 2017.

(51) Int. Cl.
| | |
|---|---|
| *B62K 25/08* | (2006.01) |
| *B62K 21/02* | (2006.01) |
| *B62K 25/24* | (2006.01) |
| *B62K 21/20* | (2006.01) |
| *B62K 19/30* | (2006.01) |
| *B62K 11/04* | (2006.01) |

(52) U.S. Cl.
CPC .............. *B62K 25/08* (2013.01); *B62K 11/04* (2013.01); *B62K 19/30* (2013.01); *B62K 21/02* (2013.01); *B62K 21/20* (2013.01); *B62K 25/24* (2013.01)

(58) Field of Classification Search
CPC ........ B62K 25/08; B62K 25/24; B62K 21/02; B62K 21/20
See application file for complete search history.

(56) References Cited

U.S. PATENT DOCUMENTS

| | | | |
|---|---|---|---|
| 3,539,196 | A | 11/1970 | Fleming |
| 4,212,481 | A | 7/1980 | Ribi |
| 4,265,329 | A | 5/1981 | Cortanze |
| 4,526,249 | A | 7/1985 | Parker |

(Continued)

FOREIGN PATENT DOCUMENTS

EP     1930234 A2    6/2008

OTHER PUBLICATIONS

B. P. Minaker, B. Durfy, "A Multibody Dynamic Analysis of a Motorcycle with a Multilink Front Suspension", Proceedings, Bicycle and Motorcycle Dynamics 2016 Symposium on the Dynamics and Control of Single Track Vehicles, Sep. 21-23, 2016, Milwaukee, Wisconsin, USA.

(Continued)

*Primary Examiner* — Kevin Hurley
*Assistant Examiner* — Michael R Stabley
(74) *Attorney, Agent, or Firm* — University of Detroit Mercy School of Law International IP Clinic

(57) ABSTRACT

A suspension system for a vehicle having a frame with a medial plane and a wheel defining a central plane. The suspension system comprises a wheel carrier rotatably connectable with the wheel and operably connected to the handle bar assembly for transferring steering motion from the handle bar assembly to the wheel, a steering shaft configured to transmit steering motion from the handle bar assembly to the wheel carrier, a plurality of locating arms, each of the plurality of locating arms having a forward end and a rearward end, a forward ball joint connecting the forward end of each of the plurality of locating arms with the wheel carrier and a rearward ball joint connecting the rearward end of each of the plurality of locating arms with the frame.

20 Claims, 23 Drawing Sheets

(56) References Cited

U.S. PATENT DOCUMENTS

| | | | |
|---|---|---|---|
| 4,721,179 A * | 1/1988 | Yamaguchi | B62K 25/26 |
| | | | 180/219 |
| 4,723,785 A * | 2/1988 | Kawaguchi | B62K 25/24 |
| | | | 280/275 |
| 4,741,545 A | 5/1988 | Honma et al. | |
| 4,813,511 A * | 3/1989 | Yamaguchi | B62K 11/04 |
| | | | 180/219 |
| 4,828,069 A * | 5/1989 | Hatsuyama | B62K 11/04 |
| | | | 180/219 |
| 4,867,467 A | 9/1989 | Huidekoper | |
| 5,361,864 A | 11/1994 | Tanaka | |
| 5,782,313 A | 7/1998 | Kurawaki et al. | |
| 6,263,994 B1 | 7/2001 | Eitel | |
| 6,349,784 B1 | 2/2002 | Heide | |
| 7,059,619 B2 | 6/2006 | Dom | |
| 7,887,077 B2 | 2/2011 | Thiers | |
| 8,042,641 B2 * | 10/2011 | Lawson | B62K 21/02 |
| | | | 180/224 |
| 8,851,221 B2 | 10/2014 | Glover | |
| 8,899,368 B2 * | 12/2014 | Ishii | B62K 25/08 |
| | | | 180/219 |
| 9,725,127 B2 * | 8/2017 | Aoki | B62K 21/02 |
| 10,131,399 B2 * | 11/2018 | Kuwabara | B62K 21/02 |
| 2017/0088230 A1 * | 3/2017 | Kuwabara | B62K 25/08 |

OTHER PUBLICATIONS

Basileios Mavroudakis, Peter Eberhard, "Analysis of alternative front suspension systems for motorcycles", Vehicle System Dynamics vol. 44, Supplement, 2006 679-689.

* cited by examiner

MULTI-LINK SUSPENSION SYSTEM

This application is a non-provisional utility application that claims the benefit of U.S. Provisional Application No. 62/553,775 filed Sep. 1, 2017.

BACKGROUND

The present disclosure pertains to vehicular suspension systems. More particularly, the present disclosure pertains to suspension systems for motorcycles and vehicles having steering systems similar to motorcycles, both motorized and non-motorized.

Motorcycle vehicles typically have a steering system that includes a telescopic fork. It is well known that the telescopic fork used in most motorcycles has a number of shortcomings inherent in its design, most notably, its tendency for diving under braking, and the sliding friction in the bushings. Over the years, there have been many attempts to modify the telescopic fork or to replace the telescopic fork with alternate linkage-based designs, although few have seen widespread use. These include 'hub-center' style systems, where large diameter front wheel bearings are used, with sufficient clearance to place the steering mechanism inside a hollow axle. Another possibility is the asymmetric single sided approach, essentially, an upper and lower A-arm style suspension that is curved around a dished wheel. These various systems have not provided desired improvements in function and performance.

Thus, it would be desirable to provide a suspension system that provides enhancement in performance, handling or the like.

SUMMARY

According to one aspect of this disclosure, a suspension system is provided for a vehicle having a frame and wheel defining a medial plane, the suspension system comprises a wheel carrier rotatably connectable with the wheel, the wheel carrier defining a steering axis, a plurality of locating arms, each having a forward end and a rearward end, a forward ball joint connecting the forward end of the locating arms with the wheel carrier, and a rearward ball joint connecting the rearward end of the locating arm with the frame.

In some embodiments, an equal number of the group of locating arms are positioned on either side of the medial plane.

In some embodiments, such a suspension system may further include one or more telescoping spring damper units operably connecting the wheel with the frame to allow suspension motion of the wheel relative to the frame. The one or more telescoping spring damper units connect the wheel carrier to the handle bar assembly, the one or more telescoping spring damper units configured to allow suspension motion of the wheel carrier and wheel relative to the handle bar assembly.

In some embodiments, the steering shaft may comprise a telescoping shaft having a top end and bottom end, and a bottom universal joint connecting the bottom end to the wheel carrier and a top universal joint connecting the top end to the handle bar assembly.

In some embodiments, the rearward end of each of the plurality of locating arms are spaced horizontally outward at a greater distance from the medial plane than the forward end of each of the group of locating arms.

In some embodiments, the group of locating arms may include an upper left arm, an upper right arm, a lower left arm, and a lower right arm. The upper left arm and the lower left arm may be positioned on the left side and vertically spaced with respect to each other and the upper right arm and the lower right arm. In some embodiments, the upper left arm and the lower left arm may be positioned on the right side and vertically spaced with respect to each other. Furthermore, in some embodiments, the rearward end of each of the upper left arm and lower left arm are vertically spaced a left rearward vertical distance from one another and where the forward end of each of the upper left arm and lower left arm are vertically spaced a left forward vertical distance from one another. The right forward vertical distance may be greater than the right rearward vertical distance, and the left forward vertical distance may be greater than the left rearward vertical distance.

In some embodiments, the rearward ball joint and forward ball joint of the upper left arm defines a first longitudinal axis, the rearward ball joint and forward ball joint of the upper right arm defines a second longitudinal axis, the rearward ball joint and forward ball joint of the lower left arm defines a third longitudinal axis, the rearward ball joint and forward ball joint of the lower right arm defines a fourth longitudinal axis. The suspension system may further include a steering axis, the steering axis intersecting all of the first longitudinal axis, second longitudinal axis, third longitudinal axis and fourth longitudinal axis.

In some embodiments, the first longitudinal axis and the second longitudinal axis intersect at an upper intersection point, the third longitudinal axis and the fourth longitudinal axis intersect at a lower intersection point and the upper intersection point, and the lower intersection point may define the steering axis. In some embodiments, the steering axis lies substantially within the medial plane when the wheel carrier is in the initial position.

In some embodiments, the wheel carrier may include a bracket having a left rail and a right rail, each rail may be substantially located on the left side and right side respectively. The bracket may further include a left setback member and a right setback member respectively, each of the rear setback member connected to the forward ball joint of each of the group of locating arms.

In some embodiments, the vehicle is a motorcycle, bicycle or other two-wheeled vehicle.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
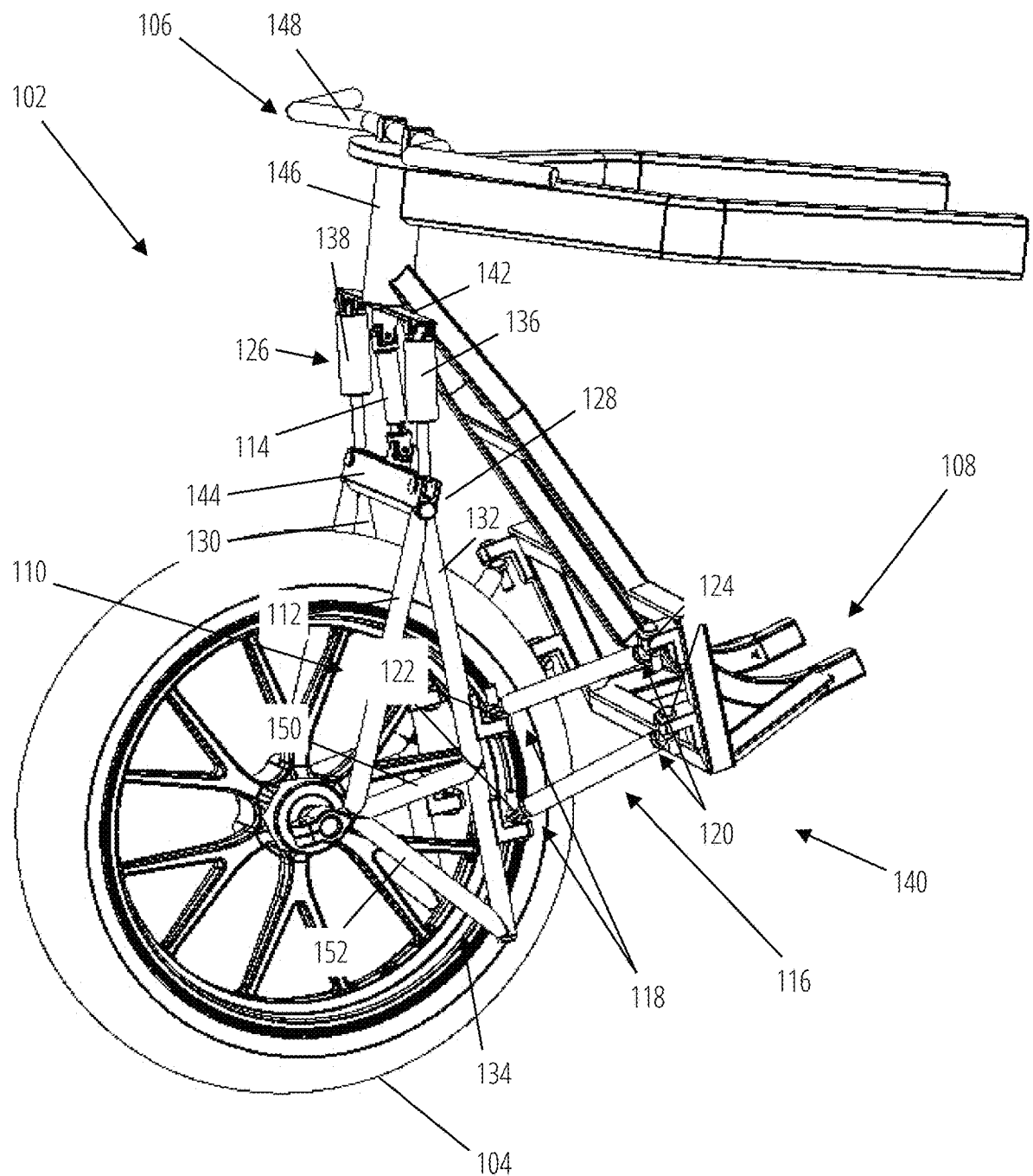
FIG. 1 is a perspective view of an embodiment of the suspension system from the left side of the two-wheeled vehicle.
Figure 2:
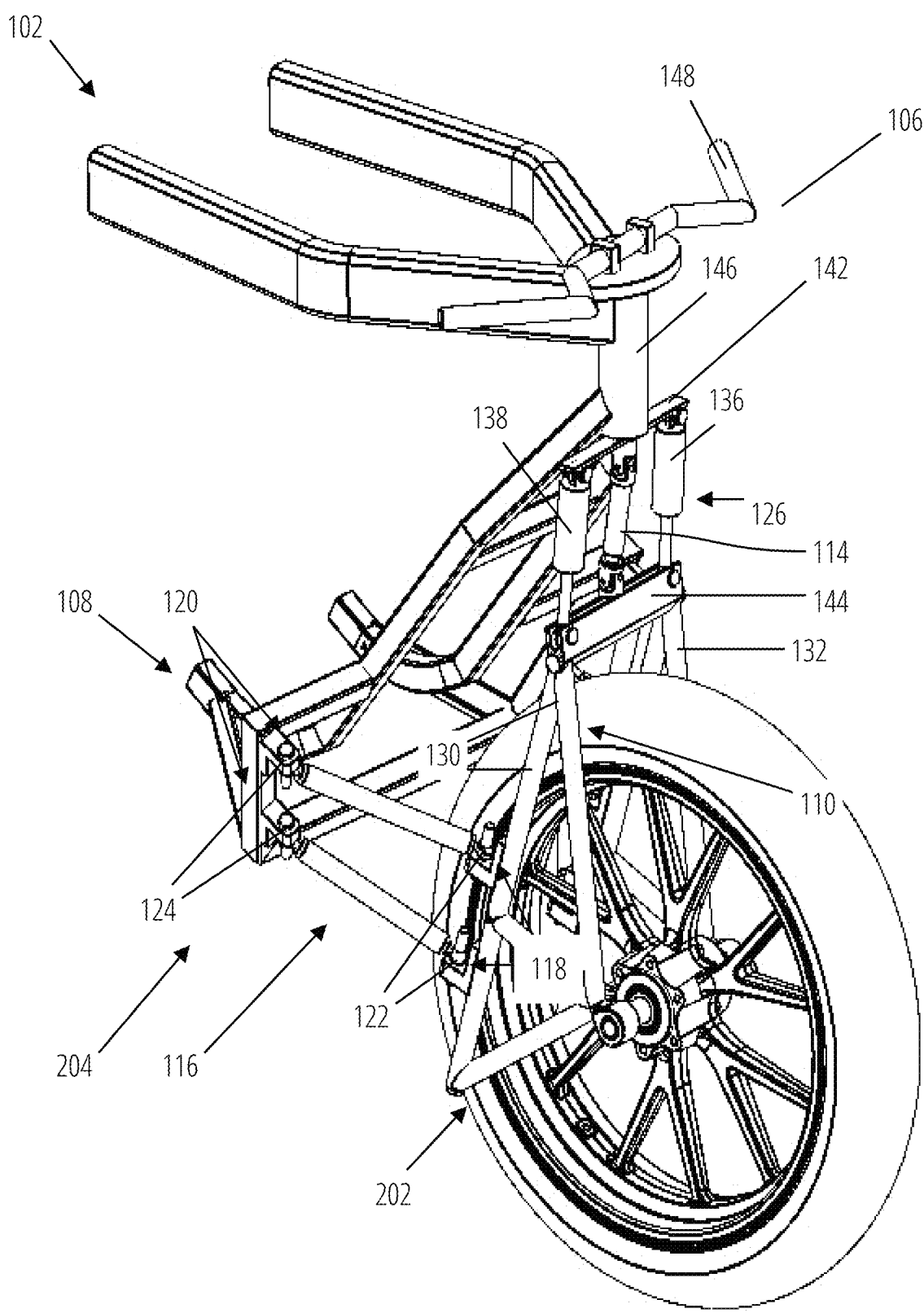
FIG. 2 is a perspective view of the suspension system of FIG. 1 from the right side of the two-wheeled vehicle.

Referring to FIG. 1 and FIG. 2, disclosed is a suspension system 102 for a vehicle, the vehicle having a frame 108 defining a medial plane 502, a wheel 104 and a handle bar assembly 106. The vehicle may include (without limitation) any one of a motorcycle, bicycle or other two-wheeled vehicle, and as discussed in detailed herein, the particular embodiment disclosed herein applies to a motorcycle. As discussed below, the frame 108 defines a medial plane 502.

The suspension system 102 comprises a wheel carrier 110 rotatably connectable with the wheel 104 and operably connected to the handle bar assembly 106 for transferring steering motion from the handle bar assembly 106 to the wheel carrier 110. The wheel 104 has a central plane 714 (discussed below), the suspension system 102 having an initial position wherein the central plane 714 of the wheel 104 is substantially coplanar with the medial plane 502.

The suspension system 102 further comprises a steering shaft 114 configured to transmit steering motion from the handle bar assembly 106 to the wheel carrier 110. Each of the plurality of locating arms 116 of the suspension system 102 further comprises a plurality of locating arms 116, each of the plurality of locating arms 116 having a forward end 118 and a rearward end 120. The suspension system 102 further comprises a forward ball joint 122, connecting the forward end 118 of each of the plurality of locating arms 116 with the wheel carrier 110, and a rearward ball joint 124 connecting the rearward end 120 of each of the plurality of locating arms 116 with the frame 108.

Referring to the embodiment disclosed in FIG. 1 and FIG. 2, the handle bar assembly 106 of the particular disclosed embodiment comprises a handle bar 148, and a bearing shaft 146 connected with the handle bar 148. Furthermore, the handle bar assembly 106 of this embodiment further comprises a top mounting plate 142.

Figure 5:
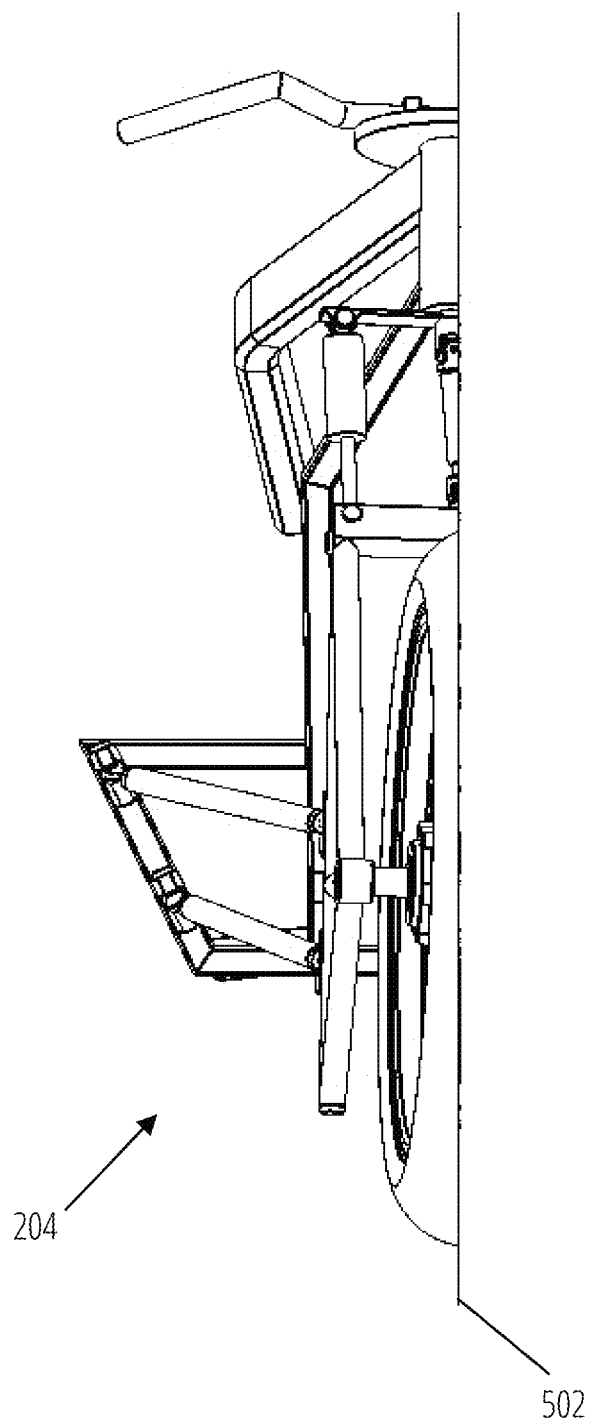
FIG. 5 is a front view of the suspension system of FIG. 1 showing the right side cut along the medial plane.
Figure 6:
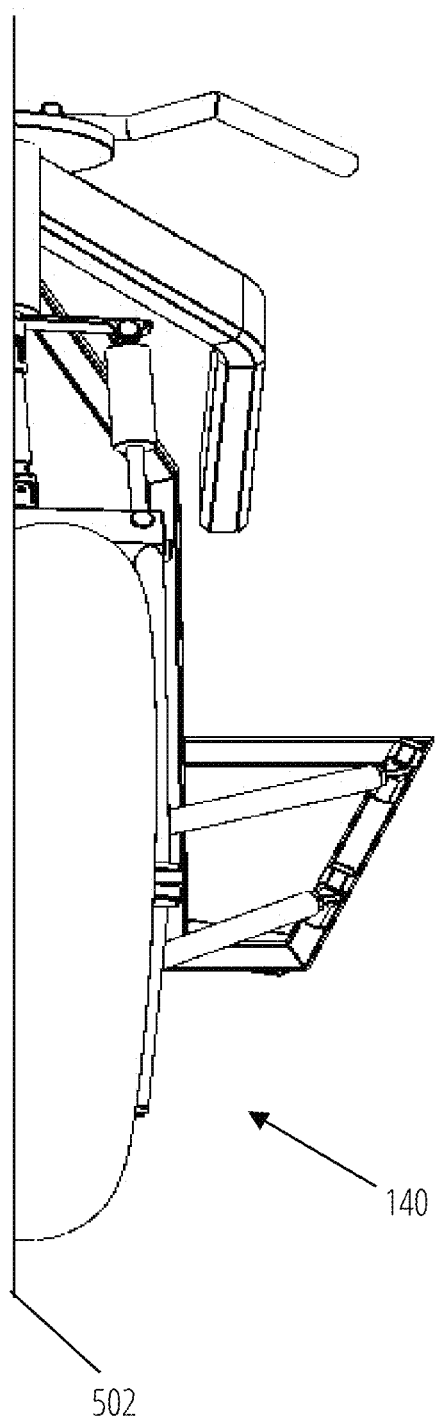
FIG. 6 is a front view of the suspension system of FIG. 1, showing the left side cut along the medial plane.

As seen in FIG. 5 and FIG. 6, the frame 108 defines a medial plane 502. The medial plane 502 runs substantially central to the frame 108, separating the frame 108 into a left side of the frame 140 and right side of the frame 204, the left side of the frame 140 and the right side of the frame 204 being substantially symmetrical to one another.

Figure 11:
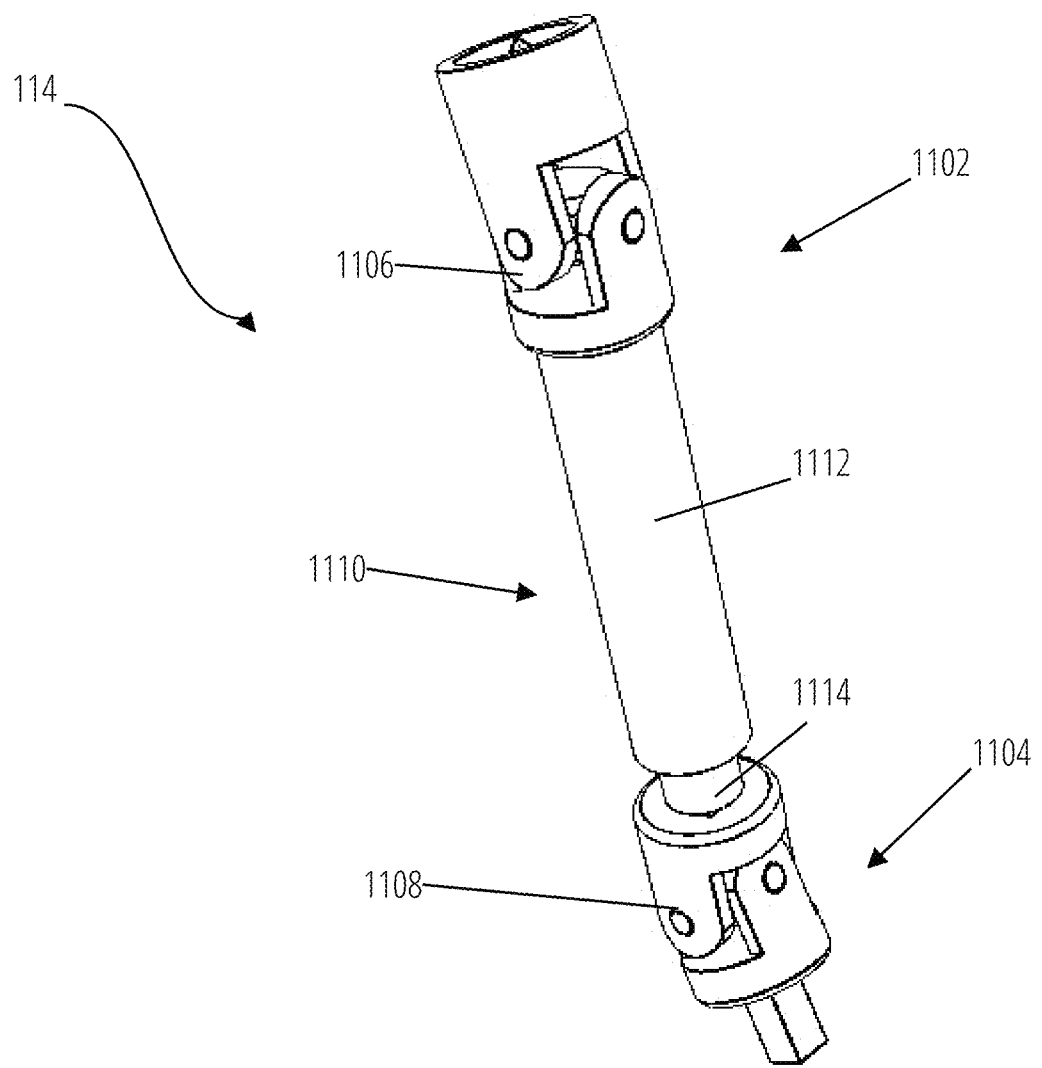
FIG. 11 is a perspective view of an embodiment of the steering shaft as disclosed herein.

Referring to the particular embodiment of FIG. 1 and FIG. 2, and as disclosed in greater detail in FIG. 11, the steering shaft 114 of the particular disclosed embodiment may comprise a telescoping shaft 1110 having an outer shaft member 1112 configured to receive an inner shaft member 1114 for telescoping, sliding motion therein. As such, the outer shaft member 1112 and inner shaft member 1114 form a telescoping sliding joint. The telescoping shaft 1110 has a top end 1102 and a bottom end 1104, and a bottom universal joint 1108 connecting the bottom end 1104 to the bottom mounting plate 144 of the wheel carrier 110 and a top universal joint 1106 connecting the top end 1102 to the top mounting plate 142 of the handle bar assembly 106. In the particular embodiment disclosed herein, the bottom universal joint 1108 and the top universal joint 1106 are standard universal joints used in the art, each of which is connected to the outer shaft member 1112 and inner shaft member 1114 respectively by any suitable means known in the art, such as welding. Furthermore, the top universal joint 1106 and bottom universal joint 1108 are each connected to the bottom mounting plate 144 and top mounting plate 142 respectively using any suitable means, including (but not limited to) welding each of the universal joints to each mounting plate respectively. Thus, the steering shaft 114 is configured to transmit steering motion from the handle bar assembly 106 to the wheel carrier 110 to allow a user to steer the vehicle.

The suspension system 102 may further comprise one or more telescoping spring damper units 126 operably connecting the wheel 104 with the frame 108 to allow suspension motion of the wheel 104 relative to the frame 108. In the particular embodiment of the suspension system 102 disclosed in FIG. 1 and FIG. 2 the one or more telescoping spring damper units 126 connect the wheel carrier 110 to the handle bar assembly 106, the one or more telescoping spring damper units 126 configured to transmit suspension motion of the wheel carrier 110 and wheel 104 relative to the handle bar assembly 106. Referring to the specific embodiment of FIG. 1 and FIG. 2, the one or more telescoping spring damper units 126 comprises a right telescoping damper 138 and a left telescoping damper 136. In this particular disclosed embodiment, the left telescoping damper 136 and right telescoping damper 138 comprise standard spring telescoping dampers, such as 8.5 inch Risse Racing® dampers, each of which is mounted to the top mounting plate 142 and the bottom mounting plate 144 respectively using spherical joints. The top mounting plate 142 of the handle bar assembly 106 of the particular disclosed embodiment comprises a mild steel plate (such as 1020 steel) and supports connection of the right telescoping damper 138 and left telescoping damper 136, as well as the steering shaft 114, to the handle bar assembly 106. However, one skilled in the art would appreciate that any alternate material of sufficient strength, including but not limited to any number of metals or metallic alloys, could be implemented to fabricate the top mounting plate 142. Furthermore, as will be apparent, one skilled in the art would appreciate that any number of dampers could be implemented and could be mounted using any number of known mounting techniques of mechanisms, all of which would fall within the scope of the subject disclosed and claimed herein.

Figure 12:
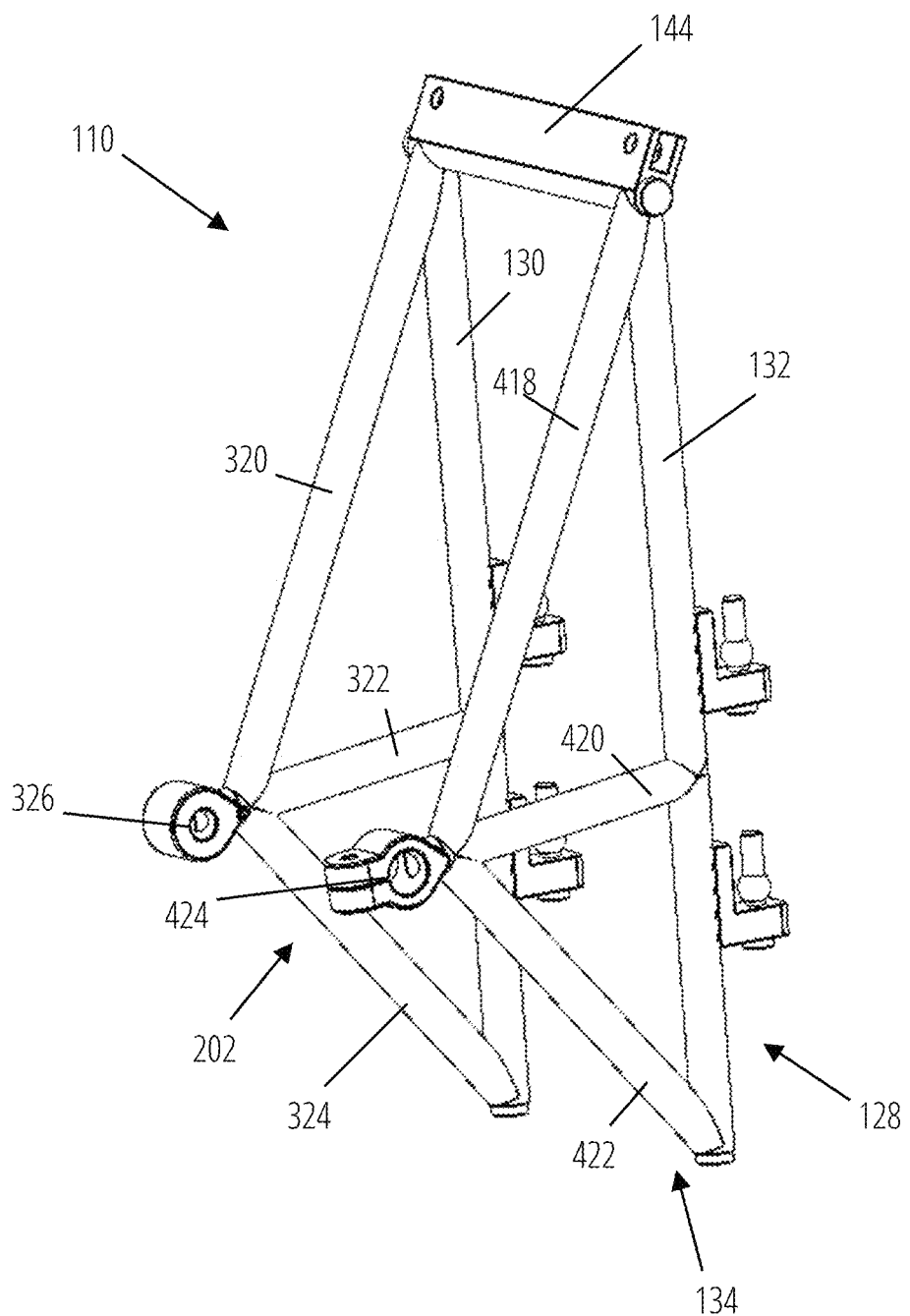
FIG. 12 is a perspective view of an embodiment of the wheel carrier as disclosed herein.
Figure 13:
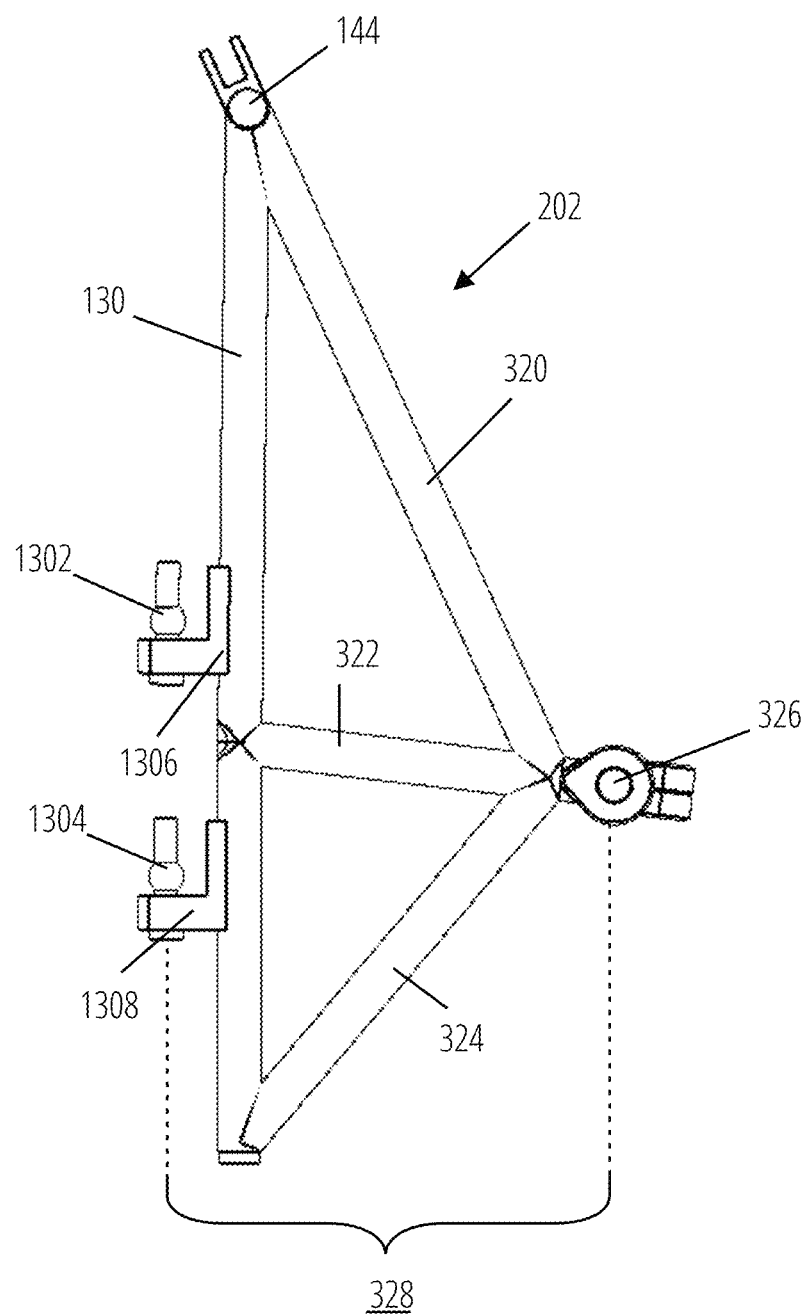
FIG. 13 is a right-side view of the wheel carrier of FIG. 12.
Figure 14:
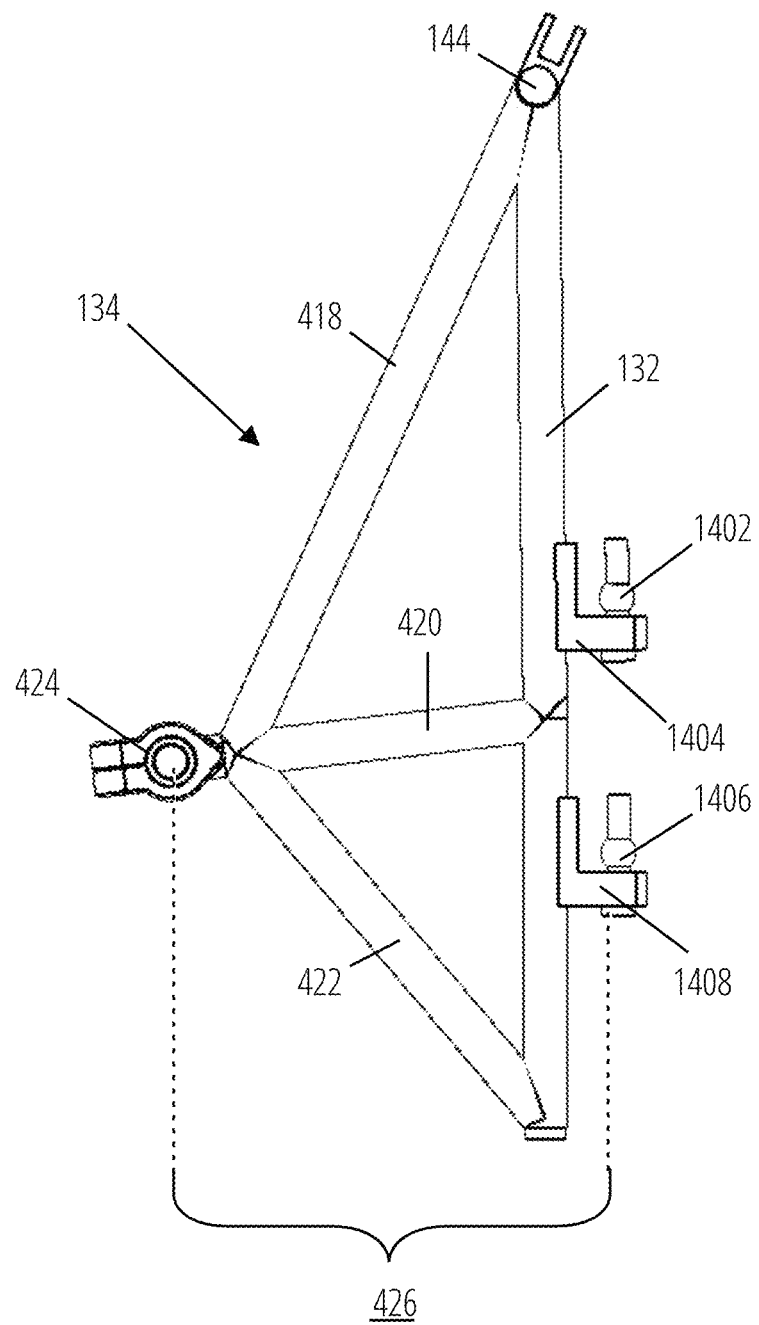
FIG. 14 is a left-side view of the wheel carrier of FIG. 13.

Disclosed in FIGS. 1 to 4, and in greater detail in FIG. 12, FIG. 13 and FIG. 14 is the wheel carrier 110 of the particular embodiment disclosed herein. The wheel carrier 110 may comprise any structural configuration which supports rotation of the wheel 104 and is operably connected to the handle bar assembly 106 to permit a user to transfer steering motion from the handle bar assembly 106 to the wheel 104. In the particular disclosed embodiment, the wheel carrier 110 comprises a bottom mounting plate 144 which as discussed herein, connects the steering shaft 114 to the wheel carrier 110 to transmit steering motion to the wheel carrier 110. Furthermore, the bottom mounting plate 144 connects the one or more telescoping spring damper units 126 to the wheel carrier 110. In this particular embodiment, the bottom mounting plate 144 is fabricated from a mild steel plate, welded to the bracket 128. The one or more telescoping spring damper units 126 are bolted with a typical spherical joint assembly to the bottom mounting plate 144.

Referring to FIGS. 1 to 4, and FIG. 12, FIG. 13 and FIG. 14, the wheel carrier 110 of the particular disclosed embodiment comprises a bracket 128 supporting rotatable connection to the wheel 104, the bracket comprising a right rail 130 and left rail 132, each rail being substantially located on opposite sides of the medial plane 502 and the frame 108. Furthermore, in the particular embodiment disclosed herein, the bracket may further comprise a left setback member 134 and right setback member 202, each setback member displacing the forward ball joint 122 of each of the plurality of locating arms 116 a left lateral rearward setback distance 426 and a right lateral rearward setback distance 328 from the left axle clamp 424 and right axle clamp 326 respectively. The left setback member 134 and right setback member 202 may comprise any suitable structural member that functions to mount the forward ball joint 122 of each of the plurality of locating arms 116 a lateral rearward distance from the axle 334, and in practice, could comprise any number of various structural formations. In the particular disclosed embodiment, the left setback member 134 comprises a left lower angled member 422, a left lateral member 420 and left upper angled member 418. Similarly, the right setback member 202 comprises a right lower angled member 324, a right lateral member 322 and a right upper angled member 320. Connected to each of these members of the left setback member 134 and right setback member 202 are a left axle clamp 424 and right axle clamp 326 respectively, each bearing connecting the wheel carrier 110 to the wheel 104 to permit rotation of the wheel 104. One skilled in the art would appreciate that the left axle clamp 424 and right axle clamp 326 can be connected to the left setback member 134 and right left setback member 134 using any suitable means, such as welding, and the particular left axle clamp 424 and right axle clamp 326 used in practice would vary depending on wheel size and application. Such modifications can be carried out by one skilled in the art.

Figure 15:
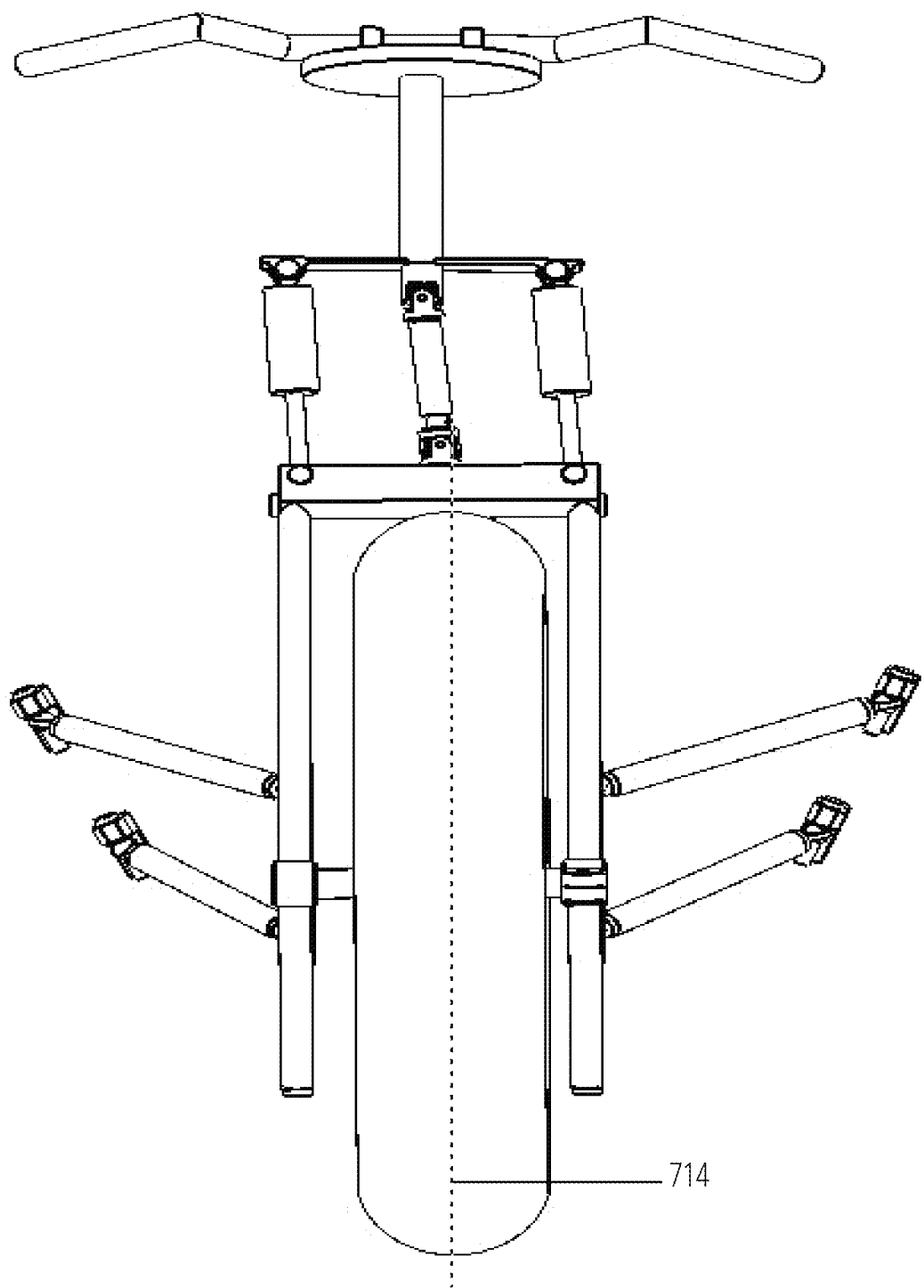
FIG. 15 is a front view of the suspension system of FIG. 1 with frame removed, showing the wheel in the initial position.

Referring to FIG. 15, the wheel 104 of the particular disclosed embodiment further comprises a central plane 714. The central plane 714 runs substantially central through the wheel 104 such that the wheel 104 is substantially symmetrical about the central plane 714.

In the particular disclosed embodiment, each of the members of the bracket 128 are fabricated from 4130 steel, with an approximate ¾ inch diameter and 0.060 inch wall thickness. Furthermore, the members are connected using standard welding techniques, including but not limited to TIG welding. However, one skilled in the art would appreciate that any number of materials and connection means could be implemented, all of which would fall within the scope of the subject matter disclosed and claimed herein.

Figure 3:
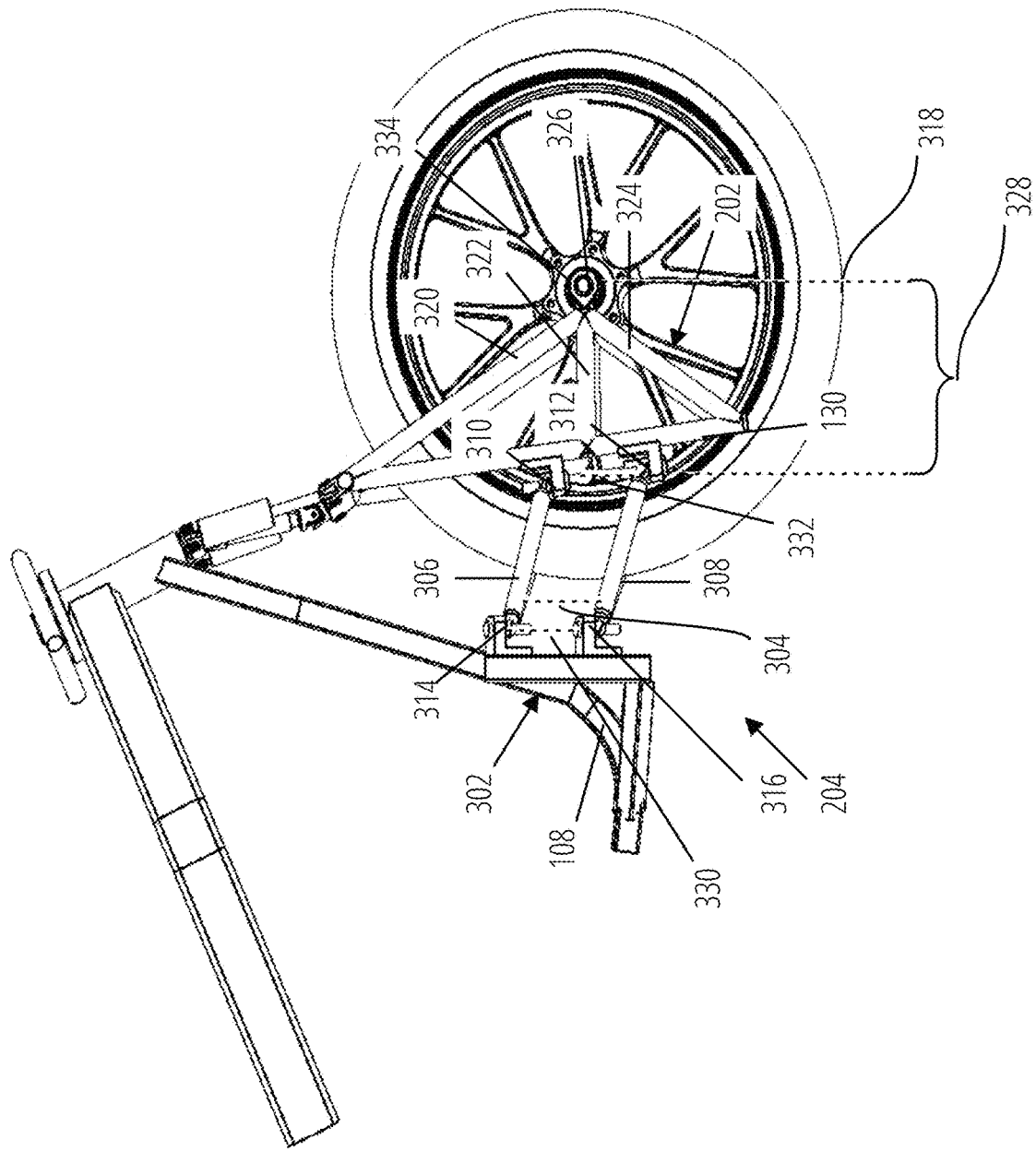
FIG. 3 is a right-side view of the suspension system of FIG. 1 in the initial position.
Figure 4:
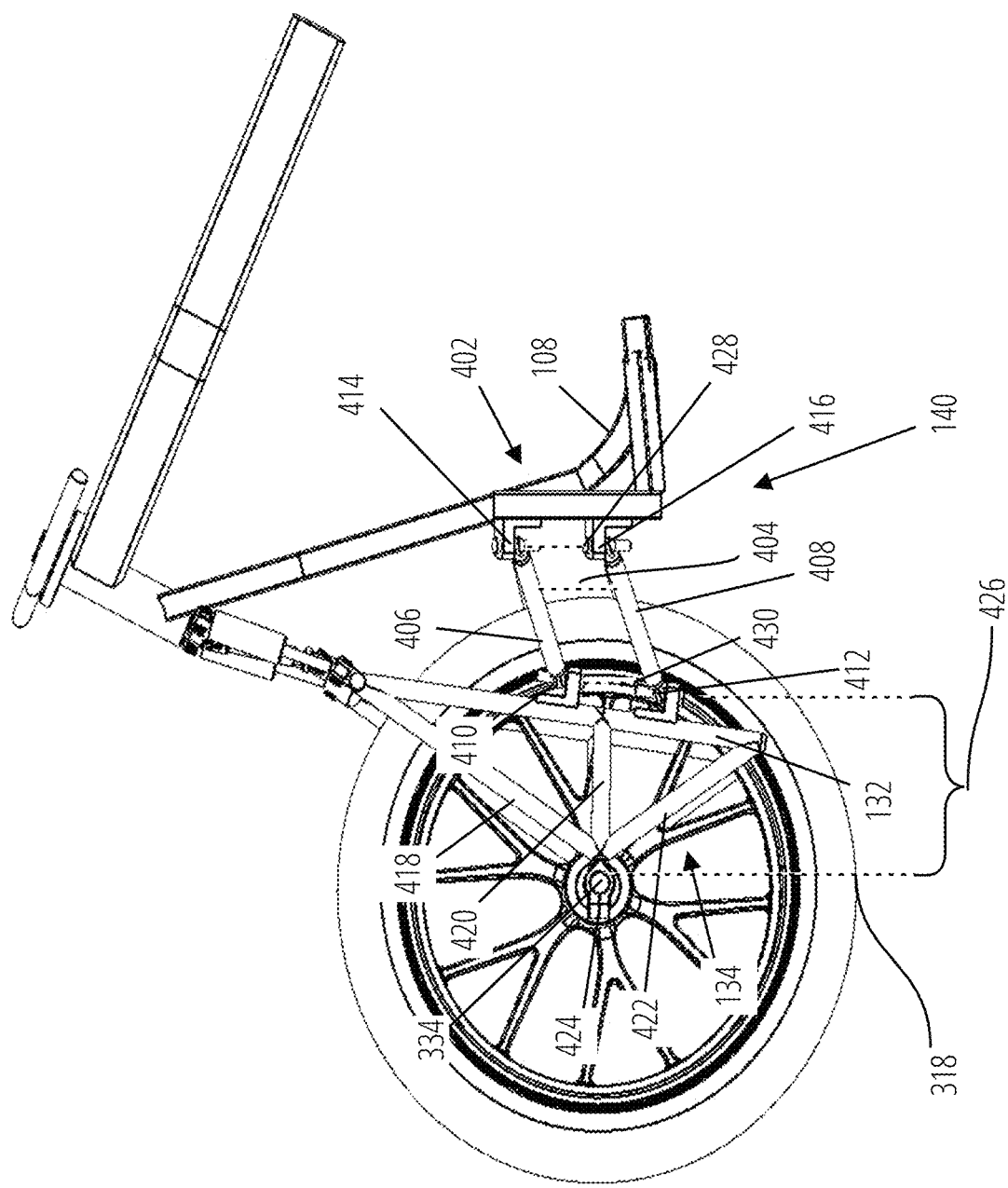
FIG. 4 is a left-side view of the suspension system of FIG. 1 in the initial position.

Referring to the disclosed embodiment of FIGS. 1 to 4, the suspension system 102 of the particular disclosed embodiment comprises an equal number of the plurality of locating arms positioned on either side of the frame 108 and the medial plane 502. Referring specifically to FIG. 3 and FIG. 4, there is an equal number of the plurality of locating arms 302 on the right side of the frame 204 and an equal number of the plurality of locating arms 402 on the left side of the frame 140. Specifically, the upper left arm 406 and upper right arm 306 form an upper pair of locating arms and the lower left arm 408 and the lower right arm 308 form a lower pair of locating arms, wherein the upper pair of locating arms are positioned vertically above the lower pair of locating arms.

Referring to FIG. 3, the equal number of the plurality of locating arms 302 positioned on the right side of the frame 204 comprise an upper right arm 306 and a lower right arm 308. The upper right arm 306 has an upper right arm rearward ball joint 314, connecting the upper right arm 306 to the frame 108 and an upper right arm forward ball joint 310 connecting the upper right arm 306 to the right rail 130 of the wheel carrier 110. The lower right arm 308 comprises a lower right arm rearward ball joint 316 connecting the lower right arm 308 to the frame 108 and a lower right arm forward ball joint 312 connecting the lower right arm 308 to the right rail 130 of the wheel carrier 110.

As disclosed in FIG. 3, the upper right arm 306 and the lower right arm 308 are vertically spaced 304 with respect to each other. Specifically, as seen in FIG. 3, there is a right rearward vertical distance 330 between the upper right arm rearward ball joint 314 and the lower right arm rearward ball joint 316 and a right forward vertical distance 332 between the upper right arm forward ball joint 310 and the lower right arm forward ball joint 312, and in the particular embodiment as disclosed in FIG. 3, the right forward vertical distance 332 is greater than the right rearward vertical distance 330.

Referring to FIG. 4, the equal number of the plurality of locating arms 402 positioned on the left side of the frame 140 comprise an upper left arm 406 and a lower left arm 408. The upper left arm 406 has an upper left arm rearward ball joint 414, connecting the upper left arm 406 to the frame 108 and an upper left arm forward ball joint 410 connecting the upper left arm 406 to the left rail 132 of the wheel carrier 110. The lower left arm 408 comprises a lower left arm rearward ball joint 416 connecting the lower left arm 408 to the frame 108 and a lower left arm forward ball joint 412 connecting the lower left arm 408 to the left rail 132 of the wheel carrier 110.

As disclosed in FIG. 4, the upper left arm 406 and the lower left arm 408 are vertically spaced 404 with respect to each other. Specifically, as seen in FIG. 4, there is a left rearward vertical distance 428 between the the upper left arm rearward ball joint 414 and the lower left arm rearward ball joint 416 and a left forward vertical distance 430 between the upper left arm forward ball joint 410 and lower left arm forward ball joint 412, and in the particular embodiment as disclosed in FIG. 4, the left forward vertical distance 430 is greater than the left rearward vertical distance 428.

As seen in FIG. 7, FIG. 8, FIG. 17 and FIG. 18, the wheel carrier 110 is in the initial position, wherein the central plane 714 of the wheel 104 is substantially coplanar with the medial plane 502. Specifically, as illustrated in the particular embodiment of FIG. 7, there are an equal number of the plurality of locating arms positioned on either side of the medial plane 502 and central plane 714, on the left side of the frame 140 and the right side of the frame 204. Positioned on the left side of the frame 140 is the upper left arm 406 and lower left arm 408. The upper left arm 406 is vertically spaced 404 from the lower left arm 408. Similarly, positioned on the right side of the frame 204 is the upper right arm 306 and the lower right arm 308, the upper right arm 306 vertically spaced 304 from the lower right arm 308.

Figure 7:
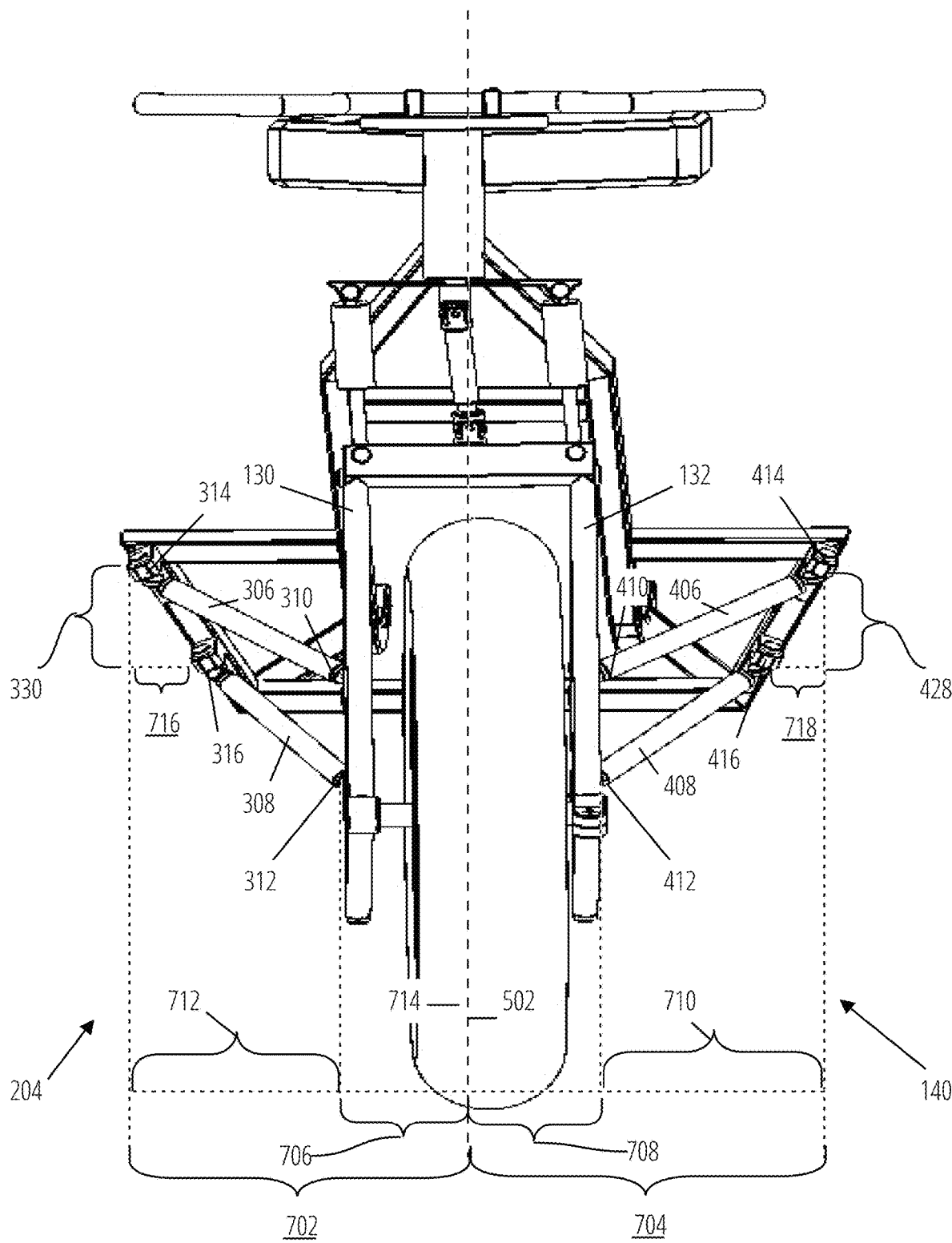
FIG. 7 is a front view of the suspension system of FIG. 1 in the initial position.

As seen in FIG. 7, the rearward end of each of the plurality of locating arms 116 are spaced horizontally outward at a greater distance from the medial plane 502 than the forward end of each of the plurality of locating arms. Furthermore, the rearward end of each of the upper arms is spaced horizontally outward at a greater distance from the medial plane 502 than the forward end of each of the lower arms.

Figure 8:
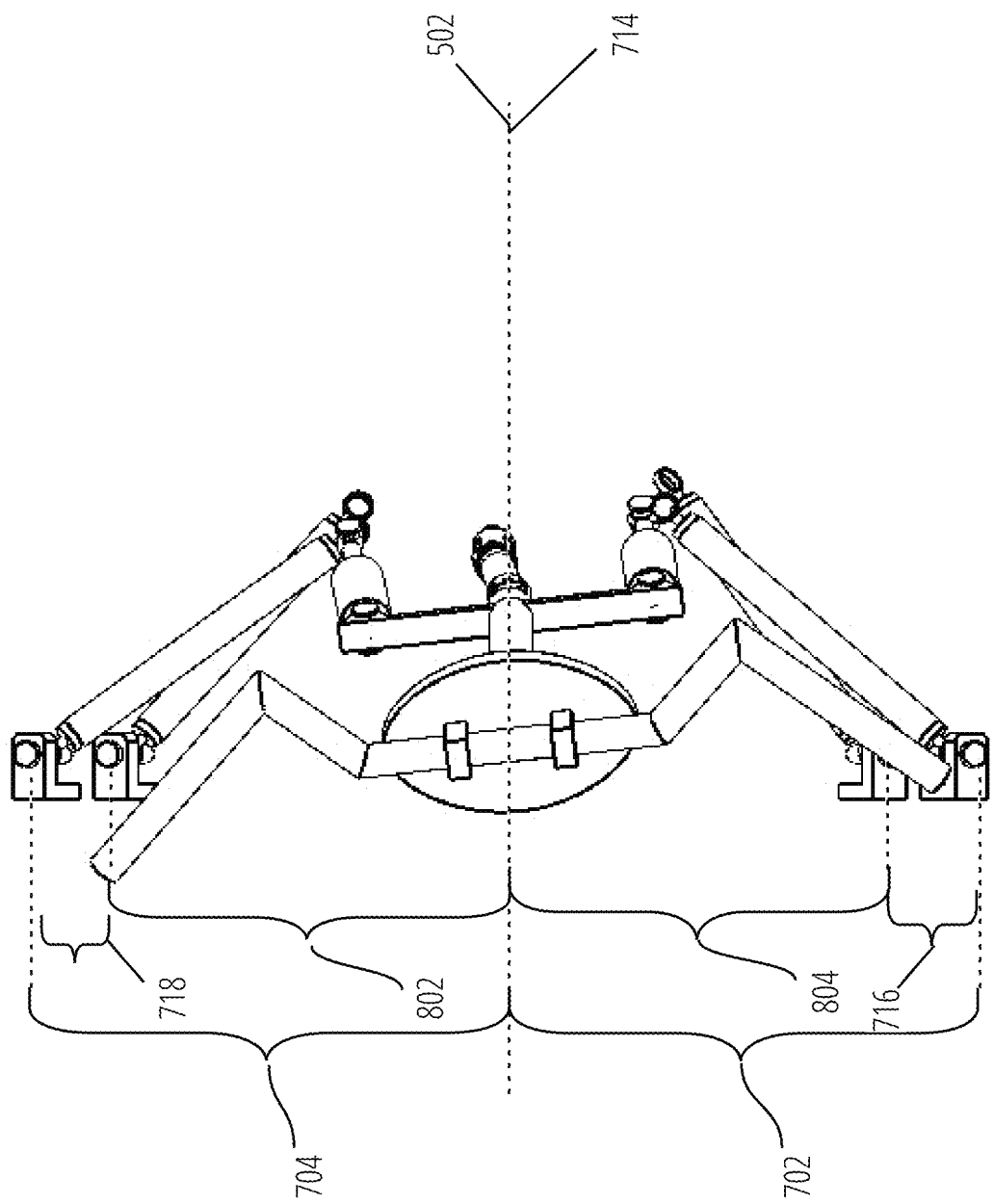
FIG. 8 is a top view of the suspension system of FIG. 1 in the initial position, with frame, wheel and wheel carrier removed.
Figure 9:
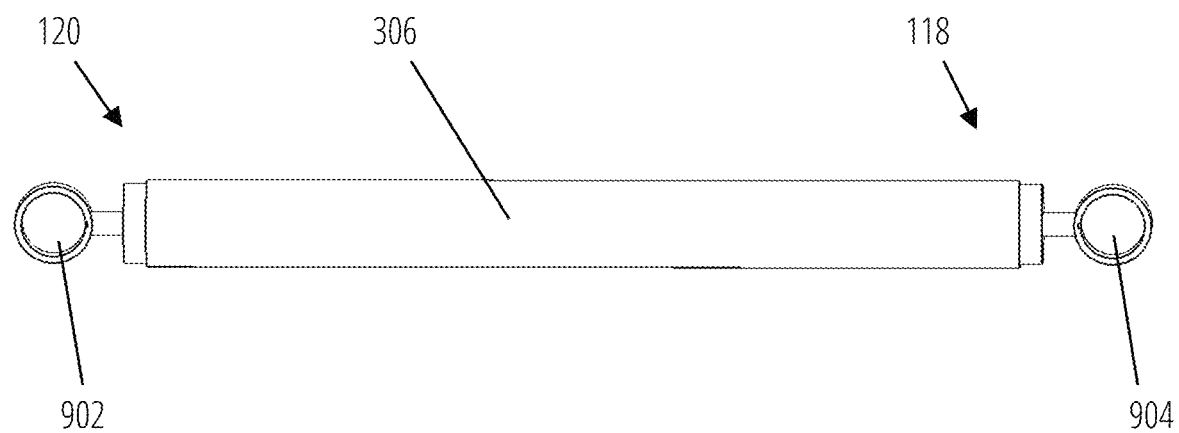
FIG. 9 is a top view of an embodiment one of the plurality of locating arms of FIG. 1.
Figure 10:
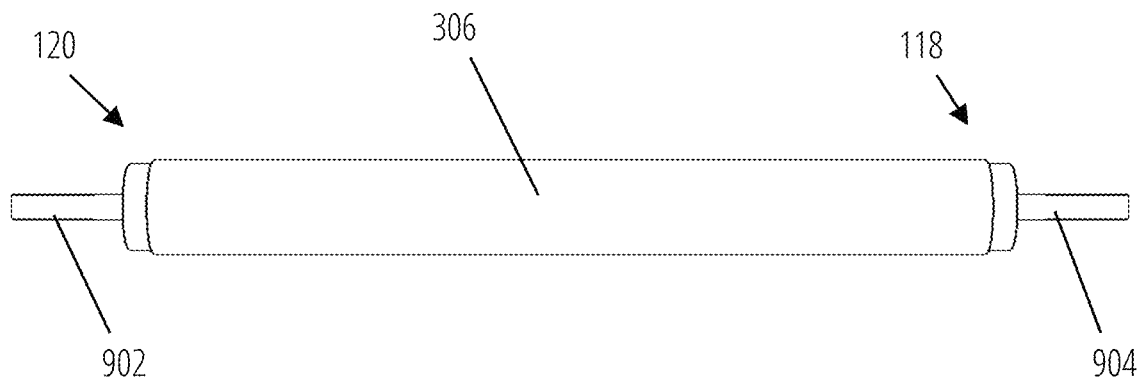
FIG. 10 is a side view of an embodiment of one of the plurality of locating arms of FIG. 1.

For example, as seen in FIG. 7 and FIG. 8, the upper left arm rearward ball joint 414 is spaced a horizontal distance 718 further outward from the medial plane 502 than lower left arm rearward ball joint 416 (i.e. the horizontal distance 704 of the upper left arm rearward ball joint 414 from the medial plane 502 is greater than the horizontal distance 802 of the lower left arm rearward ball joint 416 from the medial plane 502). Similarly, the upper right arm rearward ball joint 314 is spaced a horizontal distance 716 further outward from the medial plane 502 than lower right arm rearward ball joint 316 (i.e. the horizontal distance 702 of the upper right arm rearward ball joint 314 from the medial plane 502 is greater than the horizontal distance 804 of the lower right arm rearward ball joint 316 from the medial plane 502).

Furthermore, the upper left arm rearward ball joint 414 is spaced a horizontal distance 710 further outward from the medial plane 502 than the lower left arm forward ball joint 412 (i.e. the horizontal distance 704 of the upper left arm rearward ball joint 414 from the medial plane 502 is greater than the horizontal distance 708 of the lower left arm forward ball joint 412 from the medial plane 502). Similarly, the upper right arm rearward ball joint 314 is spaced a horizontal distance 712 further outward from the medial plane 502 than the lower right arm forward ball joint 312 (i.e. the horizontal distance 702 of the upper right arm rearward ball joint 314 from the medial plane 502 is greater than the horizontal distance 706 of the lower right arm forward ball joint 312 from the medial plane 502).

Referring to FIGS. 1 to 4, and FIG. 9 and FIG. 10, disclosed is the upper right arm 306 which is exemplary of any one of the plurality of locating arms 116 of the particular embodiment disclosed herein. The upper right arm 306 has a rearward end 120 and forward end 118, and disposed upon the rearward end 120 and forward end 118 is a rearward heim joint 902 and a forward heim joint 904 respectively. For illustration purposes, the ball of the rearward heim joint 902 and forward heim joint 904 has been removed, but would typically be joined as part of the rearward heim joint 902 and forward heim joint 904. Correspondingly, referring to FIG. 12, FIG. 13 and FIG. 14, the wheel carrier 110 comprises an upper right threaded bolt 1302, lower right threaded bolt 1304, upper left threaded bolt 1402 and a lower left threaded bolt 1406. Each of the upper right threaded bolt 1302, lower right threaded bolt 1304 respectively connect to the right rail 130 via an upper right joint connection 1306 and a lower right joint connection 1308, and each of the upper left threaded bolt 1402 and lower left threaded bolt 1406 are respectively connected to the left rail 132 via an upper left joint connection 1404 and lower left joint connection 1408. In the particular disclosed embodiment, each of the joint connections can be fabricated from 4130 steel and can be connected the respective left rail 132 and right rail 130 by any suitable means known in the art, including (but not limited to) welding the joint connections to each respective rail.

By way of a non-limiting example, each of the plurality of locating arms 116 of the particular embodiment disclosed in FIGS. 1 to 4 and FIG. 9 and FIG. 10 may be fabricated from 4130 steel, with an approximate ¾ inch diameter and 0.060 inch wall thickness. The rearward heim joint 902 and forward heim joint 904 may comprise any standard heim joint, and in the particular disclosed embodiment, the shank and hole are ⅜ inch. The rearward heim joint 902 and forward heim joint 904 are connected to each of the plurality of locating arms 116 using a standard steel plug welded into each of the rearward end 120 and forward end 118 respectively, with the heim joints drilled and threaded into each of the plugs to connect them thereto.

Each of the upper right joint connection 1306, lower right joint connection 1308, upper left joint connection 1404 and lower left joint connection 1408 are also fabricated from 4130 steel and may be welded to each of the right rail 130 and left rail 132 respectively. Each of the upper right threaded bolt 1302, lower right threaded bolt 1304, upper left threaded bolt 1402 and lower left threaded bolt 1406 connect each of the respective heim joints to each of the upper right joint connection 1306, lower right joint connection 1308, upper left joint connection 1404 and lower left joint connection 1408. The forward heim joint 904 of each of the plurality of locating arms 116 may receive each of the upper right threaded bolt 1302, lower right threaded bolt 1304, upper left threaded bolt 1402 and lower left threaded bolt 1406 thereby forming each of the upper right arm forward ball joint 310, lower right arm forward ball joint 312, upper left arm forward ball joint 410 and lower left arm forward ball joint 412 connecting each of the upper right arm 306, lower right arm 308, upper left arm 406 and lower left arm 408 to the wheel carrier 110. Although not explicitly disclosed herein, a similar connection mechanism may be used to connect each of the rearward heim joint 902 for each of the plurality of locating arms 116 to the respective left and right downtubes alongside the engine on the frame 108 of the vehicle, thereby forming the upper right arm rearward ball joint 314, lower right arm rearward ball joint 316, upper left arm rearward ball joint 414 and lower left arm rearward ball joint 416. Each of the forward ball joint 122 and rearward ball joint 124 connections has three rotational degrees of freedom, i.e. each permits simultaneous rotations around three orthogonal axes.

Figure 16:
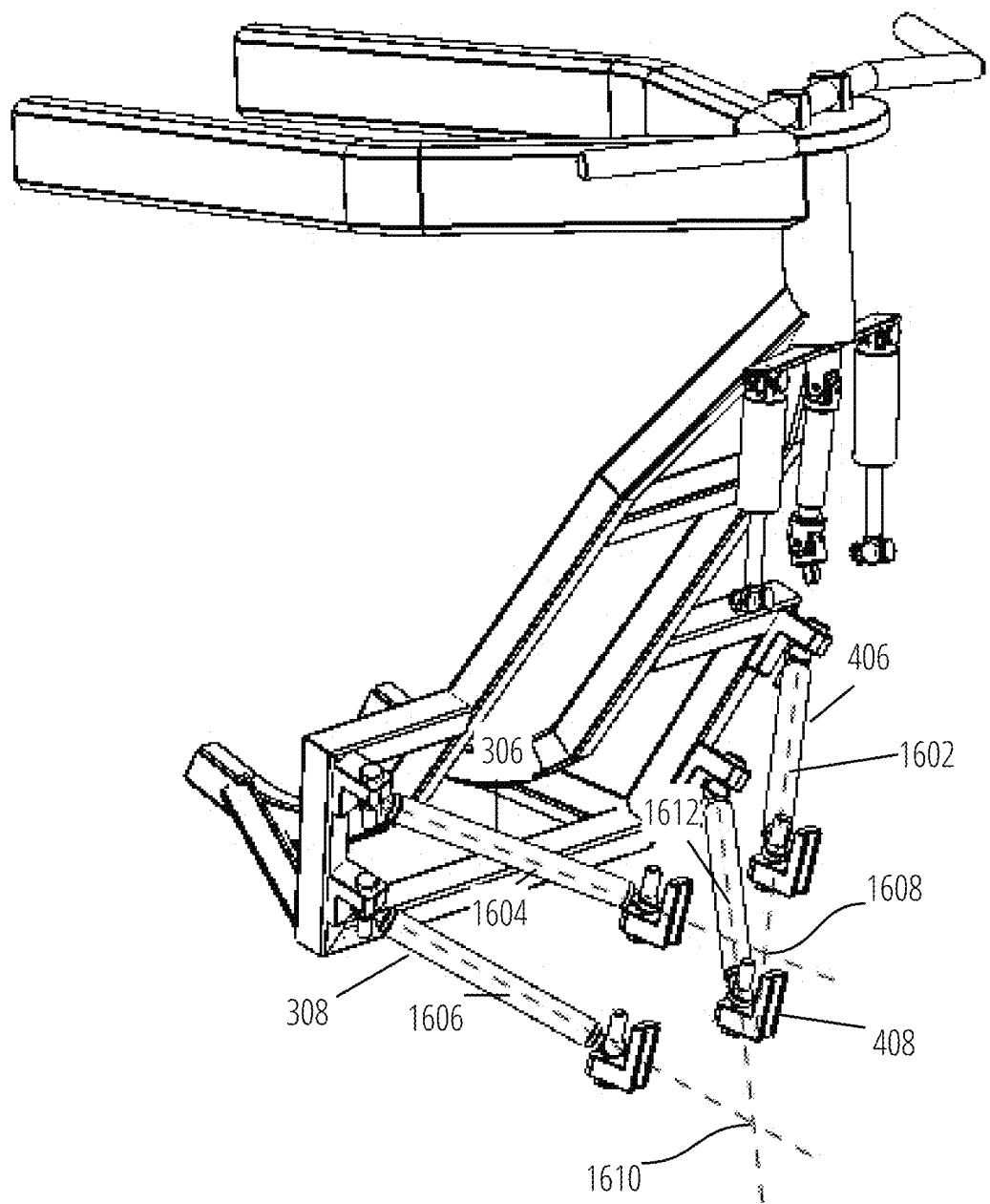
FIG. 16 is a perspective view of the suspension system of FIG. 1 in the initial position with wheel and wheel carrier removed, showing the first longitudinal axis, second longitudinal axis, third longitudinal axis and fourth longitudinal axis.
Figure 17:
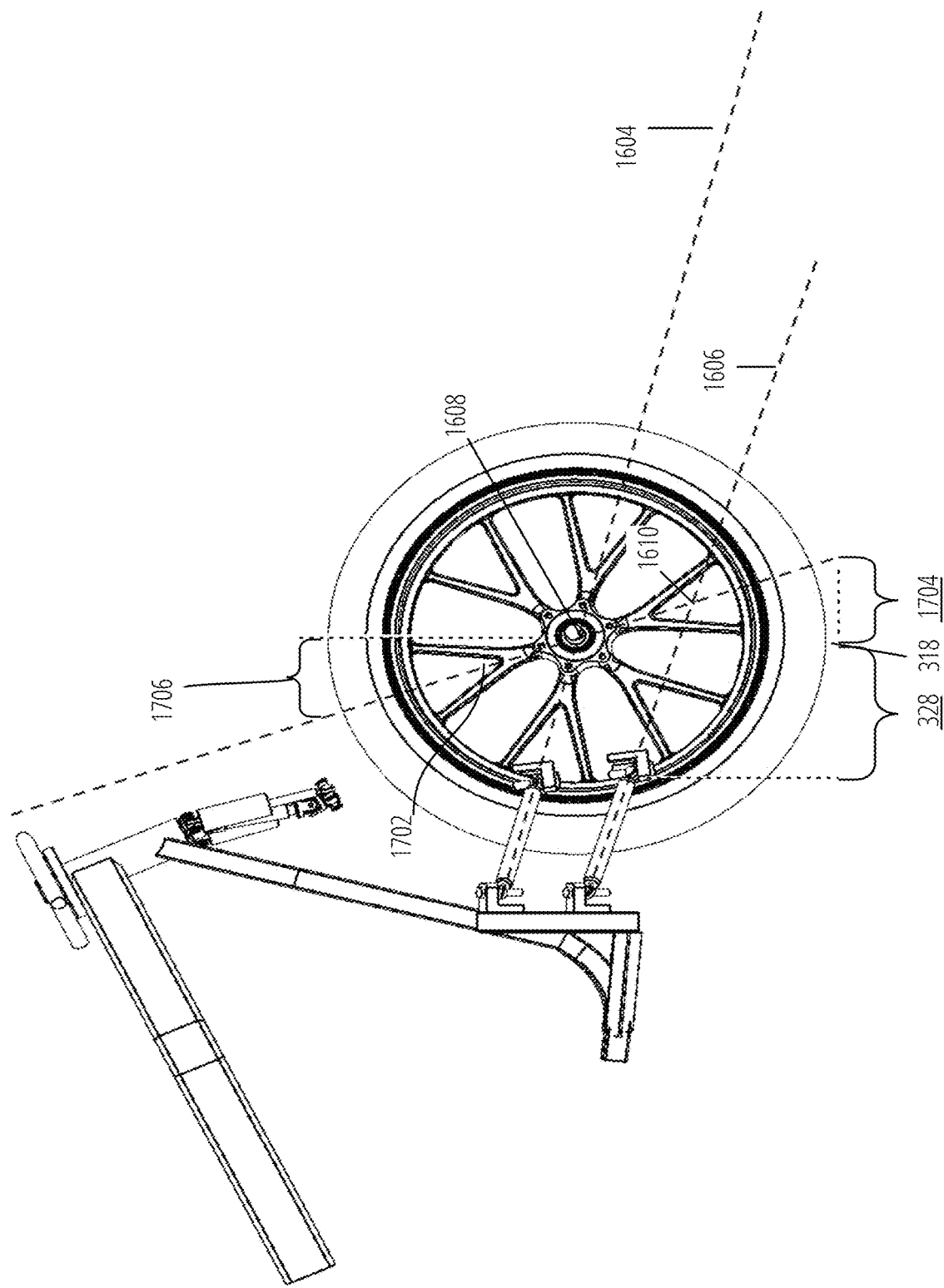
FIG. 17 is a right-side view of the suspension system of FIG. 1 in the initial position with wheel carrier removed, showing the second longitudinal axis, fourth longitudinal axis and steering axis.
Figure 18:
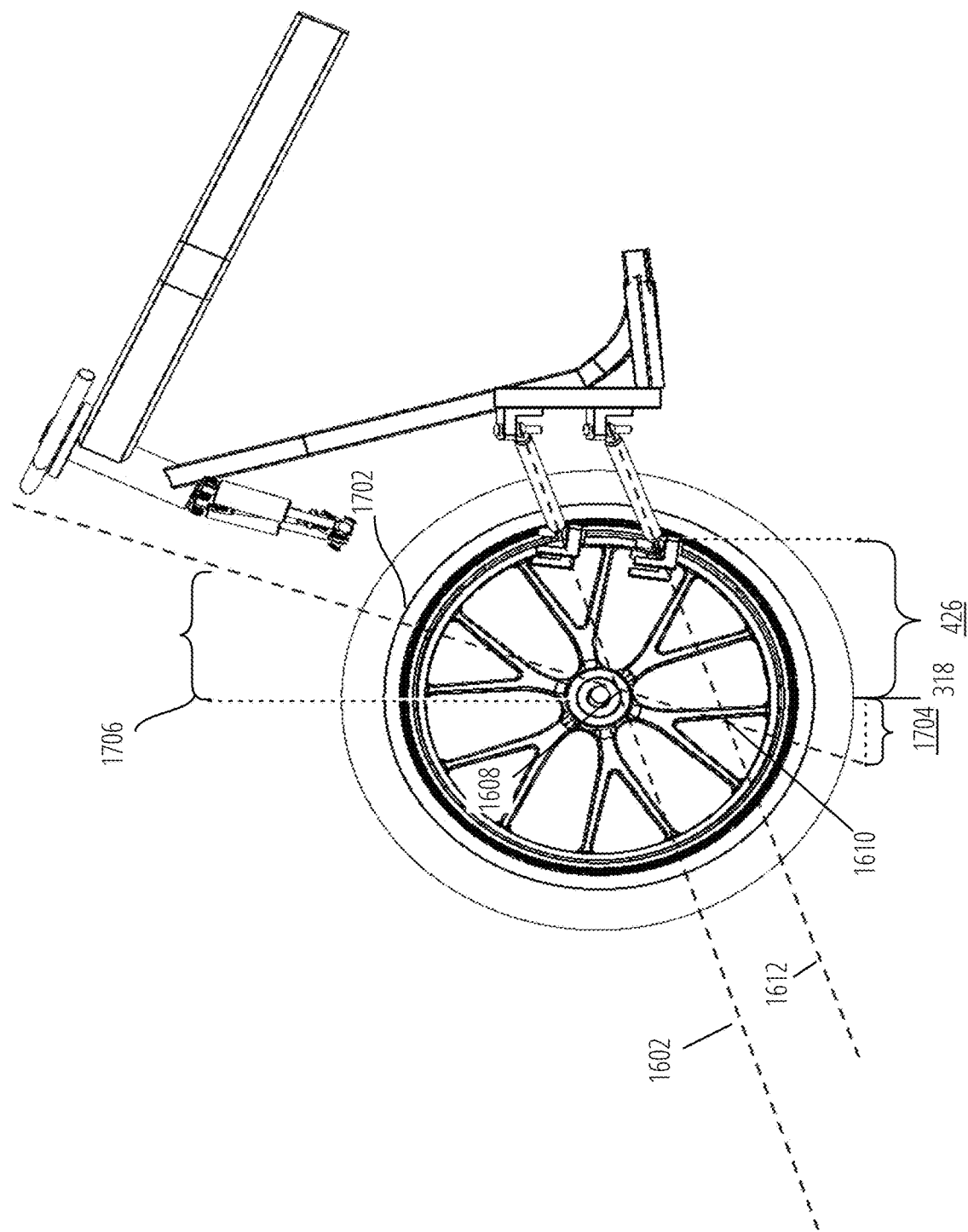
FIG. 18 is a left side view of the suspension system of FIG. 1 in the initial position with wheel carrier removed, showing the first longitudinal axis, the third longitudinal axis and the steering axis.
Figure 19:
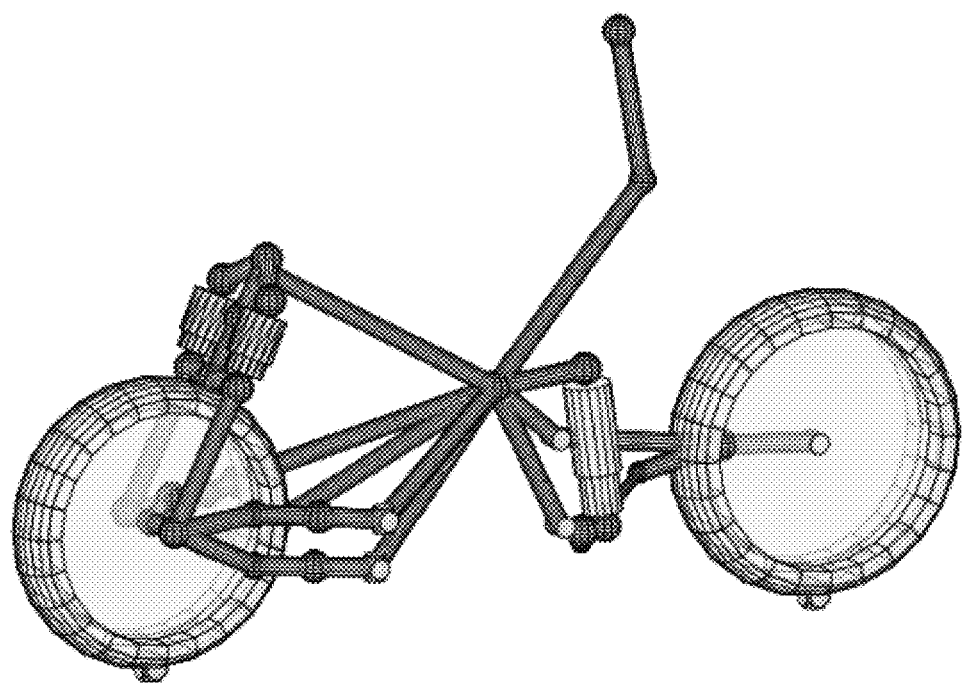
FIG. 19 is a perspective view of a multibody model embodiment of a two-wheel device such as a bicycle or motorcycle fitted with an embodiment of the suspension system as disclosed herein.
Figure 20:
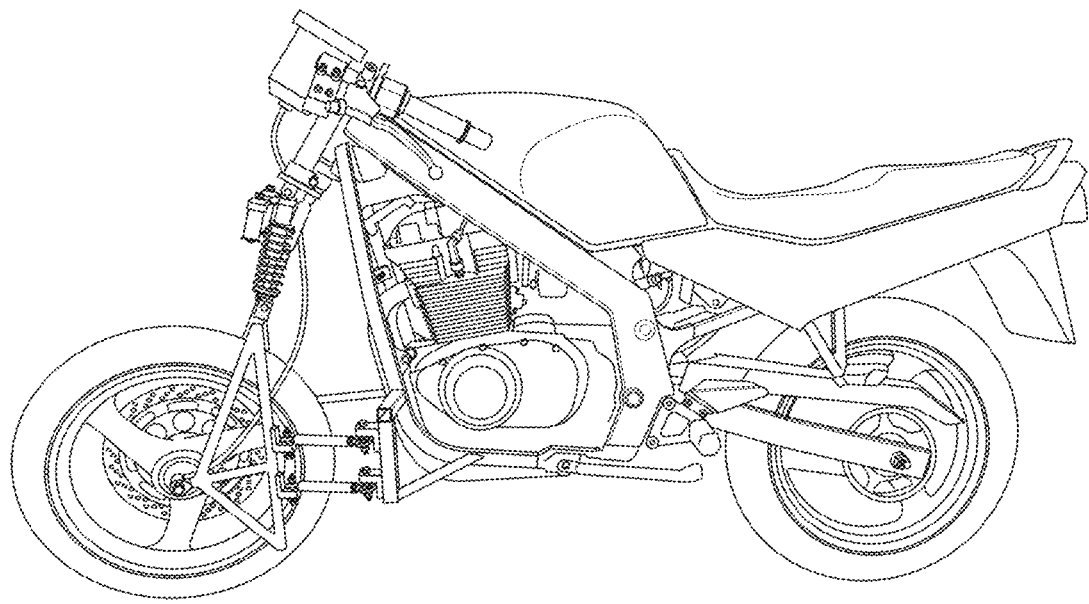
FIG. 20 is left side view of an embodiment the suspension system employed in a representative motorcycle.
Figure 21:
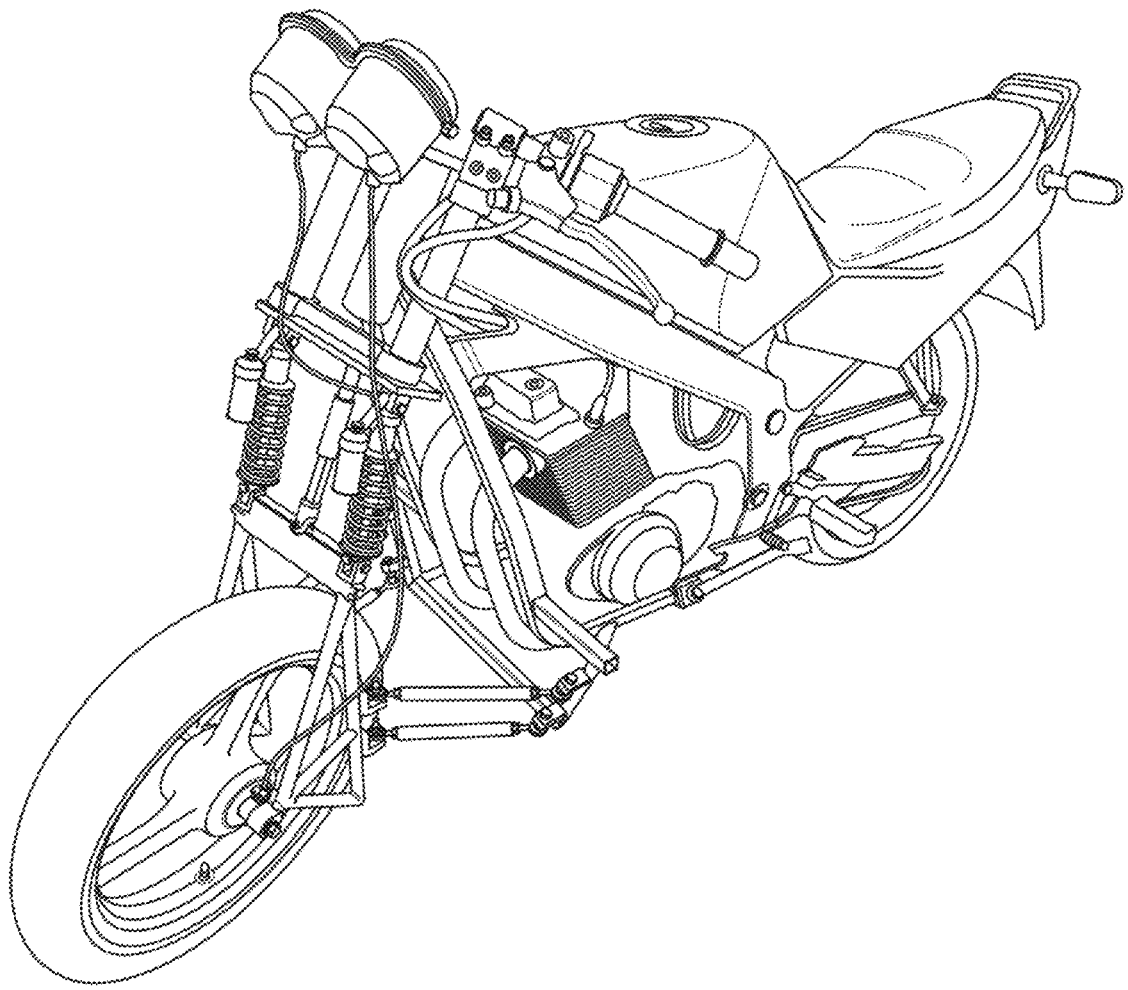
FIG. 21 is a left perspective view of the embodiment of the suspension system in the representative motorcycle of FIG. 20.
Figure 22:
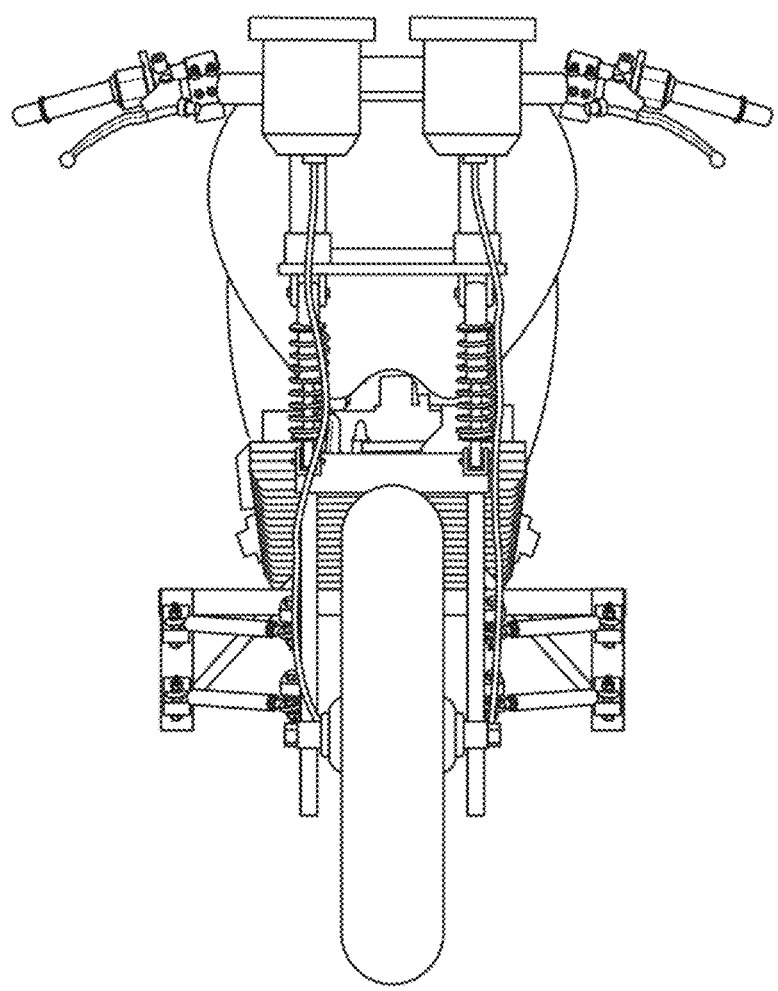
FIG. 22 is a front view of the embodiment of the suspension system in the representative motorcycle of FIG. 20.
Figure 23:
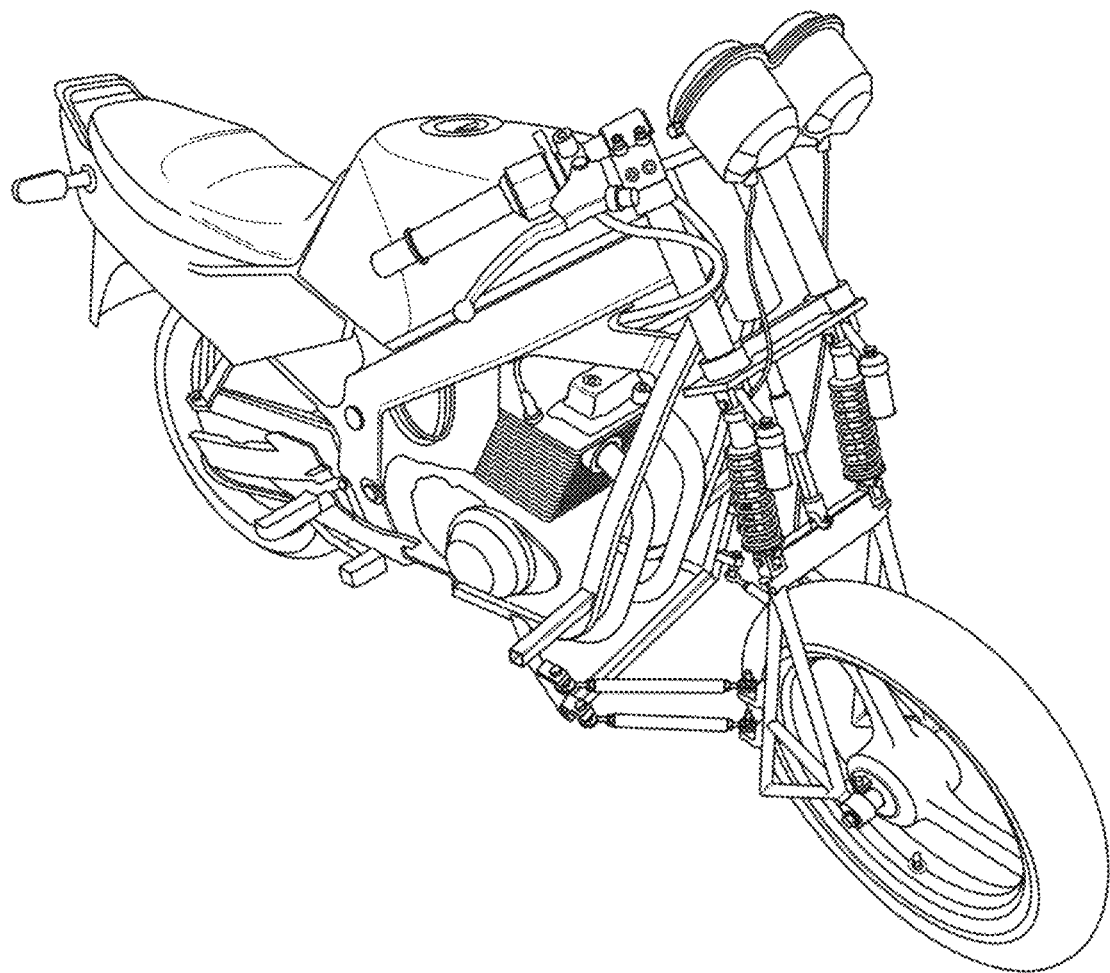
FIG. 23 illustrates right perspective view of the embodiment of the suspension system in the representative motorcycle of FIG. 20.

Referring to FIG. 16, FIG. 17 and FIG. 18, the upper left arm rearward ball joint 414 and the upper left arm forward ball joint 410 of the upper left arm 406 defines a first longitudinal axis 1602, the upper right arm rearward ball joint 314 and the upper right arm forward ball joint 310 of the upper right arm 306 defines a second longitudinal axis 1604, the lower left arm rearward ball joint 416 and the lower left arm forward ball joint 412 of the lower left arm 408 defines a third longitudinal axis 1612 and the lower right arm rearward ball joint 316 and the lower right arm forward ball joint 312 of the lower right arm 308 defines a fourth longitudinal axis 1606. The suspension system 102 further comprises a steering axis 1702, the steering axis 1702 intersecting all of the first longitudinal axis 1602, second longitudinal axis 1604, third longitudinal axis 1612 and fourth longitudinal axis 1606. In practice, the steering axis 1702 is defined by the intersection points of each of the first longitudinal axis 1602, second longitudinal axis 1604, third longitudinal axis 1612 and fourth longitudinal axis 1606, in any particular configuration of the locating arms and forward ball joints and rearward ball joints. However, as discussed in detail below, according to the teachings disclosed herein, one skilled in the art may optimize the location of the steering axis 1702 by positioning the locating arms, forward ball joints and rearward ball joints according to desired specifications and applications.

Referring to the particular disclosed embodiment of FIG. 16, when in the initial position, the upper first longitudinal axis 1602 and the second longitudinal axis 1604 intersect at an upper intersection point 1608, and the third longitudinal axis 1612 and the fourth longitudinal axis 1606 intersect at a lower intersection point 1610, wherein the upper intersection point 1608 and the lower upper intersection point 1608 define the steering axis 1702. Furthermore, as illustrated in FIG. 17 and FIG. 18, the steering axis 1702 lies substantially within the medial plane 502 when the wheel 104 is in the initial position. In the disclosed embodiment, as a user would turn the handle bar assembly 106 to transfer steering motion to the wheel carrier 110 and the wheel 104, and accordingly, move the wheel carrier 110 and wheel 104 in and out of the initial position. The steering axis 1702 would accordingly move in and out of the medial plane 502 as the plurality of locating arms 116 adjust and move along with the movement of the wheel carrier 110.

Based on the teachings of the subject matter disclosed herein, one skilled in the art could optimize the positioning and the lengths of the plurality of locating arms 116 such that the upper intersection point 1608 of the first longitudinal axis 1602 and the second longitudinal axis 1604 and the lower intersection point 1610 of the third longitudinal axis 1612 and the fourth longitudinal axis 1606. Specifically, one skilled in the art could adjust the various positions and lengths of the plurality of locating arms 116, including but not limited to any of the horizontal outward distance of each of the forward ball joint 122 and rearward ball joint 124 of each of the plurality of locating arms 116 from the medial plane 502 (such as horizontal distance 702 of the upper right arm rearward ball joint 314 from the medial plane 502, horizontal distance 704 of the upper left arm rearward ball joint 414 from the medial plane 502, horizontal distance 706 of the lower right arm forward ball joint 312 from the medial plane 502 and horizontal distance 708 of the lower left arm forward ball joint 412 from the medial plane 502), the vertical spacing of each of the upper right arm 306 and upper left arm 406 from the lower right arm 308 and lower left arm 408 respectively (including the right rearward vertical distance 330 and right forward vertical distance 332, and the left rearward vertical distance 428 and left forward vertical distance 430), the right lateral rearward setback distance 328 and the left lateral rearward setback distance 426 and the horizontal distance of rearward end of each of the upper right arm 306 and upper left arm 406 from the lower right arm 308 and lower left arm 408 respectively such that the upper intersection point 1608 and lower intersection point 1610 define a steering axis 1702 defining a desired trail 1704 and desired rake angle 1706. This level of optimization, specifically, positioning the plurality of locating arms 116 to define a steering axis 1702, which in turn defines a desired trail 1704 and rake angle 1706, and simultaneously the path and orientation of the wheel carrier 110 during suspension motion, can be based on the requirements of the specific application.

For example, in the particular embodiment disclosed in FIG. 20, FIG. 21, FIG. 22 and FIG. 23, the suspension system 102 has been retrofit onto a 1991 Suzuki GS 500e, which motorcycle has certain manufacturer specifications regarding optimal trail 1704 and rake angle 1706. Without limiting the generality, for this particular model, the rake angle 1706 and trail 1704 would be approximately on the order of 24 degrees from vertical and 96 mm (3.8 inches) respectively. Furthermore, as discussed in detail below, further exemplary spacing and geometry are presented as part of the dynamic model discussion.

Based on the foregoing, the plurality of locating arms effectively allows suspension motion (i.e. relative motion of the wheel 104 and the frame 108 in a substantially vertical direction) in a manner similar to a conventional four bar linkage type mechanism, while simultaneously allowing an additional independent steering motion (i.e. rotation of the wheel 104 and wheel carrier 110 around the steering axis 1702) in a similar manner. Due to the combined and simultaneous suspension motion and steering motion, and three-dimensional nature of the motions, the mechanism comprises a number of locating arms having ball joints on both their forward and rearward ends.

What is claimed is:

1. A suspension system for a vehicle, the vehicle comprising a frame having a medial plane defining a left side a right side of the frame, a wheel having a central plane and a central axle and a handle bar assembly, the suspension system comprising:
   a wheel carrier rotatably connectable with the wheel and operably connected to the handle bar assembly for transferring steering motion from the handle bar assembly to the wheel, the wheel carrier having an initial position wherein the central plane of the wheel is substantially coplanar with the medial plane, wherein the wheel carrier comprises a bracket having a left rail and a right rail, each rail being substantially located on the left side and right side respectively and wherein the bracket further comprises a left setback member and a right setback member respectively, each of the rear setback member connected to the forward ball joint of each of the plurality of locating arms;
   a steering shaft configured to transmit steering motion from the handlebar assembly to the wheel carrier;
   a plurality of locating arms, each of the plurality of locating arms having a forward end and a rearward end wherein the locating arms are connected to the frame at a location below the handlebar and generally planar with the wheel axle;

a forward ball joint connecting the forward end of each of the plurality of locating arms with the wheel carrier; and a rearward ball joint connecting the rearward end of each of the plurality of locating arms with the frame.

2. The suspension system of claim 1, wherein an equal number of the plurality of locating arms are positioned on either side of the medial plane.

3. The suspension system of claim 1, further comprising one or more telescoping spring damper units operably connecting the wheel with the frame to allow suspension motion of the wheel relative to the frame.

4. The suspension system of claim 3, wherein the one or more telescoping spring damper units connect the wheel carrier to the handle bar assembly, the one or more telescoping spring damper units configured to allow suspension motion of the wheel carrier and wheel relative to the handle bar assembly.

5. A suspension system for a vehicle, the vehicle comprising a frame having a medial plane defining a left side a right side of the frame, a wheel having a central plane and a handle bar assembly, the suspension system comprising:
  a wheel carrier rotatably connectable with the wheel and operably connected to the handle bar assembly for transferring steering motion from the handle bar assembly to the wheel, the wheel carrier having an initial position wherein the central plane of the wheel is substantially coplanar with the medial plane;
  a steering shaft configured to transmit steering motion from the handlebar assembly to the wheel carrier;
    a plurality of locating arms, each of the plurality of locating arms having a forward end and a rearward end;
    a forward ball joint connecting the forward end of each of the plurality of locating arms with the wheel carrier; and
  a rearward ball joint connecting the rearward end of each of the plurality of locating arms with the frame,
  wherein the steering shaft comprises a telescoping shaft having a top end and bottom end, and a bottom universal joint connecting the bottom end to the wheel carrier and a top universal joint connecting the top end to the handle bar assembly, the telescoping shaft transferring steering motion from the handle bar assembly to the wheel carrier.

6. A suspension system for a vehicle, the vehicle comprising a frame having a medial plane defining a left side a right side of the frame, a wheel having a central plane and a handle bar assembly, the suspension system comprising:
  a wheel carrier rotatably connectable with the wheel and operably connected to the handle bar assembly for transferring steering motion from the handle bar assembly to the wheel, the wheel carrier having an initial position wherein the central plane of the wheel is substantially coplanar with the medial plane;
  a steering shaft configured to transmit steering motion from the handlebar assembly to the wheel carrier;
    a plurality of locating arms, each of the plurality of locating arms having a forward end and a rearward end;
    a forward ball joint connecting the forward end of each of the plurality of locating arms with the wheel carrier; and a rearward ball joint connecting the rearward end of each of the plurality of locating arms with the frame,
  wherein the rearward end of each of the plurality of locating arms are spaced horizontally outward at a greater distance from the medial plane than the forward end of each of the plurality of locating arms.

7. A suspension system for a vehicle, the vehicle comprising a frame having a medial plane defining a left side a right side of the frame, a wheel having a central plane and a handle bar assembly, the suspension system comprising:
  a wheel carrier rotatably connectable with the wheel and operably connected to the handle bar assembly for transferring steering motion from the handle bar assembly to the wheel, the wheel carrier having an initial position wherein the central plane of the wheel is substantially coplanar with the medial plane;
  a steering shaft configured to transmit steering motion from the handlebar assembly to the wheel carrier;
    a plurality of locating arms, each of the plurality of locating arms having a forward end and a rearward end;
    a forward ball joint connecting the forward end of each of the plurality of locating arms with the wheel carrier; and
  a rearward ball joint connecting the rearward end of each of the plurality of locating arms with the frame,
  wherein the plurality of locating arms includes an upper left arm, an upper right arm, a lower left arm, and a lower right arm, the upper left arm and the lower left arm being positioned on the left side and vertically spaced with respect to each other and the upper right arm and the lower right arm being positioned on the right side and vertically spaced with respect to each other.

8. The suspension system of claim 7, rearward end of each of the upper right arm and the lower right arm are vertically spaced a right rearward vertical distance from one another, and the forward end of each of the upper right arm and the lower right arm are vertically spaced a right forward vertical distance from each one other, and the rearward end of each of the upper left arm and lower left arm are vertically spaced a left rearward vertical distance from one another and where the forward end of each of the left upper left arm and lower left arm are vertically spaced a left forward vertical distance from one another.

9. The suspension system of claim 8, wherein the right forward vertical distance is greater than the right rearward vertical distance, and the left forward vertical distance is greater than the left rearward vertical distance.

10. The suspension system of claim 7, wherein the rearward ball joint and forward ball joint of the upper left arm defines a first longitudinal axis, the rearward ball joint and forward ball joint of the upper right arm defines a second longitudinal axis, the rearward ball joint and forward ball joint of the lower left arm defines a third longitudinal axis, the rearward ball joint and forward ball joint of the lower right arm defines a fourth longitudinal axis, the suspension system further comprising a steering axis, the steering axis intersecting all of the first longitudinal axis, second longitudinal axis, third longitudinal axis and fourth longitudinal axis.

11. The suspension system of claim 10, wherein the first longitudinal axis and the second longitudinal axis intersect at an upper intersection point, the third longitudinal axis and the fourth longitudinal axis intersect at a lower intersection point, and wherein the upper intersection point and the lower intersection point define the steering axis.

12. The suspension system of claim 10, wherein the steering axis lies substantially within the medial plane when the wheel carrier is in the initial position.

13. A suspension system for a vehicle comprising a frame having a medial plane defining a left side a right side of the frame, and a wheel defining a central plane, the suspension system comprising:
- a wheel carrier rotatably connectable with the wheel and operably connected to the handle bar assembly for transferring steering motion from the handle bar assembly to the wheel, the wheel carrier having an initial position wherein the central plane of the wheel is substantially coplanar with the medial plane;
- a steering shaft configured to transmit steering motion from the handle bar assembly to the wheel carrier;
- an upper pair of locating arms connecting the wheel carrier with the frame; and
- a lower pair of locating arms connecting the wheel carrier with the frame;
- wherein each of the upper pair of locating arms and lower pair of locating arms has a forward end having a forward ball joint connected with the wheel carrier and a rearward end having a rearward ball joint connected with the frame.

14. The suspension system of claim 13, wherein the upper pair of locating arms are positioned vertically above relative to the lower pair of locating arms.

15. The suspension system of claim 13, wherein the upper pair of locating arms comprises an upper left arm and an upper right arm positioned on the left side and the right side respectively and the lower pair of locating arms comprises a lower left arm and a lower right arm positioned on the left side and the right side respectively.

16. The suspension system of claim 15, wherein the rearward ball joint and forward ball joint of the upper left arm defines a first longitudinal axis, the rearward ball joint and forward ball joint of the upper right arm defines a second longitudinal axis, the rearward ball joint and forward ball joint of the lower left arm defines a third longitudinal axis, the rearward ball joint and forward ball joint of the lower right arm defines a fourth longitudinal axis, the suspension system further comprising a steering axis, the steering axis intersecting all of the first longitudinal axis, second longitudinal axis, third longitudinal axis and fourth longitudinal axis.

17. The suspension system of claim 16, wherein the first longitudinal axis and the second longitudinal axis intersect at an upper intersection point, the third longitudinal axis and the fourth longitudinal axis intersect at a lower intersection point, and wherein the upper intersection point and the lower intersection point define the steering axis.

18. The suspension system of claim 16, wherein the steering axis lies substantially within the medial plane when the wheel carrier is in the initial position.

19. The suspension system of claim 13, wherein the rearward end of each of the upper pair of locating arms are spaced horizontally outward at a greater distance from the medial plane than the forward end of each of the plurality of locating arms.

20. The suspension system of claim 13, wherein the wheel carrier comprises a bracket have a left rail and a right rail, each rail being substantially located on left side and the right side, respectively.

* * * * *